United States Patent
Kuze et al.

(10) Patent No.: US 7,406,007 B2
(45) Date of Patent: Jul. 29, 2008

(54) OPTICAL DISC APPARATUS AND SPHERICAL ABERRATION CORRECTION CONTROLLING APPARATUS

(75) Inventors: Yuuichi Kuze, Osaka (JP); Katsuya Watanabe, Nara (JP); Kenji Kondo, Osaka (JP); Shin-ichi Yamada, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 460 days.

(21) Appl. No.: 10/931,373

(22) Filed: Sep. 1, 2004

(65) Prior Publication Data

US 2005/0047291 A1 Mar. 3, 2005

(30) Foreign Application Priority Data

Sep. 2, 2003 (JP) ............................. 2003-309789

(51) Int. Cl.
G11B 7/00 (2006.01)
(52) U.S. Cl. .................. 369/44.32; 369/53.19; 369/118
(58) Field of Classification Search ........................ None
See application file for complete search history.

(56) References Cited

U.S. PATENT DOCUMENTS 6,141,302 A * 10/2000 Koyama et al. .......... 369/44.24
7,054,253 B1 * 5/2006 Nomura et al. ......... 369/112.02
7,142,484 B2 * 11/2006 Ando et al. ............... 369/44.23
7,142,497 B2 * 11/2006 Hirai ....................... 369/112.17
7,164,638 B2 * 1/2007 Wada et al. .............. 369/53.19

FOREIGN PATENT DOCUMENTS

JP 2002-157750 5/2002

\* cited by examiner

*Primary Examiner*—Wayne Young
*Assistant Examiner*—Adam R Giesy
(74) *Attorney, Agent, or Firm*—Renner, Otto, Boiselle & Sklar, LLP

(57) ABSTRACT

An optical disc apparatus is provided, which comprises a lens tilting section for tilting an objective lens to correct coma aberration occurring in a light beam spot focused on an information surface of an optical disc, a spherical aberration correcting section for correcting spherical aberration occurring in a light beam spot focused on the information surface, and a lens tilt-spherical aberration correction control section for controlling the spherical aberration correcting section to change an amount of spherical aberration correction performed by the spherical aberration correcting section depending on a tilt of the objective lens tilted by the lens tilting section.

18 Claims, 20 Drawing Sheets

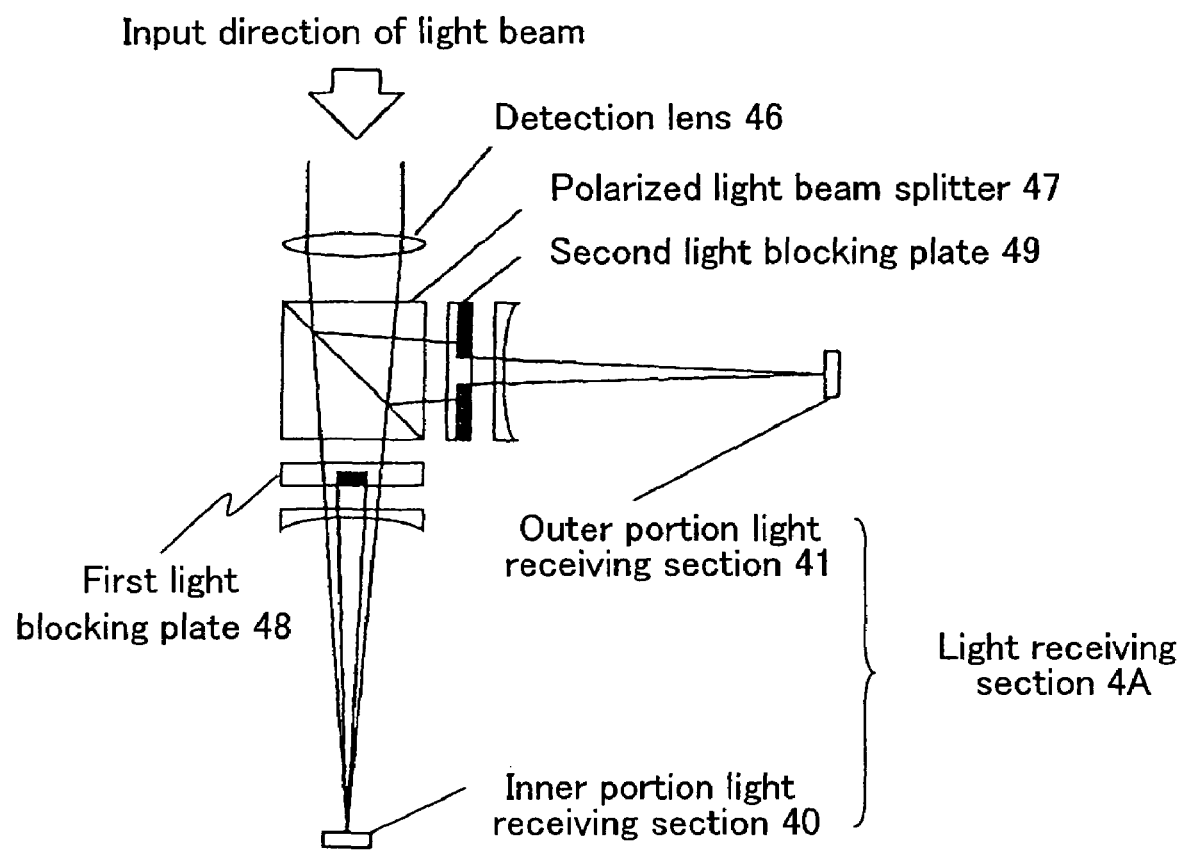

(a) Lens tilt is zero (b) Lens tilt is positive (c) Lens tilt is negative

| Lens tilt | te | tc | ta | tb | td | ... |
|---|---|---|---|---|---|---|
| Spherical aberration correction amount | se | sc | sa | sb | sd | ... |

Lens tilt – spherical aberration correction amount association section 36

Tilt control signal → Lens tilt – spherical aberration correction amount converting section 27 (Non-volatile memory) → Spherical aberration correction signal (a)

(b)

(a)

(b)

(a)

(b)

(a)

(b)

(a)

(b)

(a) Optimum thickness (b) Thin thickness

OPTICAL DISC APPARATUS AND SPHERICAL ABERRATION CORRECTION CONTROLLING APPARATUS

This non-provisional application claims priority under 35 U.S.C. §119(a) on Patent Application No. 2003-309789 filed in Japan on Sep. 2, 2003, the entire contents of which are hereby incorporated by reference.

BACKGROUND OF THE INVENTION

1. Field of the Invention

The present invention relates to an optical disc apparatus and a spherical aberration correction controlling apparatus.

2. Description of the Related Art

Recently, optical discs, such as DVD-ROM, DVD-RAM, DVD-RW, DVD-R, DVD+RW, DVD+R, and the like, have been developed as high density/large capacity recording media.

To date an optical lens having a numerical aperture (NA) of 0.6 has been used as an objective lens of an optical disc apparatus for recording information onto the above-described optical discs and/or reproducing information from those optical discs. In order to obtain an optical disc having a higher density/larger capacity (e.g., a Blue-ray Disc (BD), etc.), the use of a blue-violet laser and an optical lens having an NA of 0.8 or more has been studied.

For the above-described optical discs, a multi-layer structure having two or more recording layers (information surfaces) has been studied.

Hereinafter, lens tilt control and spherical aberration correction performed by conventional optical disc apparatuses will be described (see Japanese Laid-Open Publication No. 2002-157750 (particularly, paragraphs 0070 to 0101, and FIGS. 1 to 8)).

FIG. 13 is a block diagram showing a conventional optical disc apparatus 300. The optical disc apparatus 300 records information onto an optical disc 320 and reproduces information from the optical disc 320.

The optical disc 320 has an information surface for recording information (not shown in FIG. 13) and a protection layer for protecting the information surface provided on the information surface (not shown in FIG. 13). In addition, tracks are provided on the information surface of the optical disc 320.

An optical head section 350 comprises: a light source 303, such as a semiconductor laser or the like, which serves as a light beam generating section; a light receiving section 304 for receiving a light beam which is output from the light source 303 and is thereafter reflected from the optical disc 320; an optical system 352; and an optical drive section 354 for driving the optical system 352.

The optical system 352 comprises an objective lens 301 and a pair of spherical aberration correcting lenses 315.

The spherical aberration correcting lenses 315 are a concave lens 315a and a convex lens 315b. Note that the concave lens 315a and the convex lens 315b may be arranged in a manner different from that shown in FIG. 13.

The optical drive section 354 comprises: a focus actuator 302 for moving the objective lens 301 in relation to the information surface of the optical disc 320; and a spherical aberration correcting actuator 334 for driving the spherical aberration correcting lenses 315 in a manner which changes a distance between the concave lens 315a and the convex lens 315b to prevent the occurrence of spherical aberration.

The optical disc apparatus 300 corrects spherical aberration which is attributed to a predetermined thickness of the protection layer of the optical disc 320 to improve the quality of a signal which is recorded onto or reproduced from the optical disc 320.

Focus control performed by the conventional optical disc apparatus 300 will be described below.

The optical disc apparatus 300 rotates the optical disc 320 (information carrier) at predetermined rpm by means of a disc motor 310.

A light beam output from the light source 303 is focused by the objective lens 301 onto the information surface of the optical disc 320, thereby forming a light beam spot. At the light beam spot, the light beam is reflected from the optical disc 320. The reflected light beam is passed through the objective lens 301 again and is thereafter input to the light receiving section 304.

The light receiving section 304 has four separate regions. Each region generates a photocurrent, the amount of which depends on the amount of light received by the region. The light receiving section 304 outputs the generated photocurrent to a preamplifier 306.

The preamplifier 306 serves as an I/V converter to convert the photocurrent into a voltage. The preamplifier 306 outputs a voltage signal, which has been converted from a current signal, to a focus error signal generator 307.

The focus error signal generator 307 generates a focus error signal indicating a deviation (error) of the light beam spot in a direction perpendicular to the optical disc 320 based on the four signals output from the preamplifier 306. Hereinafter, the focus error signal is also referred to as an FE signal.

For example, the focus error signal generator 307 uses an astigmatism correction method to generate an FE signal. The focus error signal generator 307 outputs the generated FE signal to a focus control circuit 317.

The focus control circuit 317 subjects the FE signal to a filter operation, such as phase compensation, gain compensation, or the like. Thereafter, the focus control circuit 317 outputs the FE signal to a focus actuator driving circuit 309.

The focus actuator driving circuit 309 generates a drive signal based on the FE signal output from the focus control circuit 317, and outputs the generated drive signal to the focus actuator 302.

The focus actuator 302 serves as an objective lens moving section. The focus actuator 302 moves the objective lens 301 in a direction substantially perpendicular to the information surface of the optical disc 320 based on the drive signal output from the focus actuator driving circuit 309, thereby changing the focus position of the light beam.

The focus control circuit 317 controls the focus actuator driving circuit 309 in a manner which causes the FE signal generated by the focus error signal generator 307 to be substantially zero. As a result, the light beam spot is in focus to a predetermined level on the information surface of the optical disc 320. In this manner, focus control is achieved.

Next, the lens tilt control of the conventional optical disc apparatus 300 will be described.

A tilt control section 319 outputs a tilt control signal to a tilt actuator driving circuit 326 in accordance with a command output from a microcomputer 308.

The tilt actuator driving circuit 326 applies offset signals having different polarities to two drive signals output from the focus actuator driving circuit 309 based on the tilt control signal. In other words, the tilt actuator driving circuit 326 makes a predetermined difference between the two drive signals output from the focus actuator driving circuit 309.

With the offset signals from the tilt actuator driving circuit 326, one side of the objective lens 301 is lowered, while the other side thereof is raised. Thus, the objective lens 301 can be tilted depending on the tilt of the optical disc 320, thereby making it possible to cancel a blurry light beam spot, i.e., coma aberration, which is attributed to the tilt of the information surface of the optical disc 320.

In the following descriptions, a technique for controlling the tilt of the objective lens 301 in a manner which cancels coma aberration attributed to the tilt of the optical disc 320, is also referred to as lens tilt control.

Hereinafter, lens tilt control will be described.

FIG. 14 is a schematic diagram for explaining a relationship between a tilt of the optical disc 320 and lens tilt control.

As shown in portion (a) of FIG. 14, the optical disc 320 is ideally placed perpendicularly to a light beam output from the light source 303. When the optical disc 320 is perpendicular to the light beam, the objective lens 301 is also placed perpendicularly to the light beam. Thereby, coma aberration does not occur in a light beam spot on the information surface of the optical disc 320, so that reproduction and recording can be satisfactorily performed.

In actual situations, however, the optical disc 320 may not be perpendicular to a light beam output from the light source 303. For example, when the optical disc 320 is warped, the peripheral portion of the optical disc 320 is not perpendicular, i.e., is tilted, with respect to the light beam output from the light source 303.

It is assumed that the optical disc 320 is tilted from a direction perpendicular to a light beam. In this case, if the objective lens 301 remains perpendicular to the light beam, coma aberration occurs in a light beam spot on the information surface of the optical disc 320, so that the light beam is not correctly brought into focus. As a result, reproduction/recording performance is lowered.

To avoid the above-described problem, the objective lens 301 is tilted to face in the same direction as that of the optical disc 320 as shown in portions (b) and (c) of FIG. 14. As a result, it is possible to cancel coma aberration which occurs in a light beam spot on the information surface of the optical disc 320. Thus, reproduction and recording can be satisfactorily performed.

The objective lens 301 is tilted toward the same direction as that of the tilted optical disc 320. However, the tilt of the objective lens 301 may not be exactly equal to the tilt of the optical disc 320. The tilt of the objective lens 301 may be optimally determined based on an optical constant(s) of the objective lens 301.

Next, spherical aberration correction will be described with reference to the optical disc apparatus 300 of FIG. 13.

A spherical aberration correction control section 335 outputs a spherical aberration correction signal to a spherical aberration correction driving circuit 333 in accordance with a command output from the microcomputer 308.

The spherical aberration correction driving circuit 333 generates a drive signal based on the spherical aberration correction signal, and outputs the generated drive signal to the spherical aberration correcting actuator 334.

The spherical aberration correcting actuator 334 drives the spherical aberration correcting lens 315 based on the drive signal.

The spherical aberration correcting actuator 334 changes a distance between the concave lens 315a and the convex lens 315b (spherical-aberration correcting lenses 315) based on the drive signal output from the spherical aberration correction driving circuit 333 to correct spherical aberration which occurs in a light beam spot. Thus, it is possible to correct a blurry light beam spot (i.e., spherical aberration) which occurs on the information surface of the optical disc 320. That is, spherical aberration correction can be achieved.

Further, spherical aberration correction will be described below.

FIG. 15 is a cross-sectional view showing a state of a light beam in relation to the optical disc 320. As described above, the optical disc 320 comprises a protection layer 321 for protecting an information surface 329, the protection layer 321 being provided on the information surface 329.

Portion (a) of FIG. 15 shows the case where the thickness of the protection layer 321 from the surface of the optical disc 320 to the information surface 329 is optimum, so that spherical aberration does not occur on the information surface 329.

Portion (b) of FIG. 15 shows the case where the thickness of the protection layer 321 from a surface of the optical disc 320 to the information surface 329 is smaller than the optimum value, so that spherical aberration occurs on the information surface 329.

Hereinafter, an inner portion and an outer portion of the light beam will be described separately.

It is assumed that the above-described focus control is being performed. In this case, the protection layer 321 of the optical disc 320 diffracts a light beam output from the light source 303 of the optical disc apparatus 300, so that the outer portion of the light beam is brought into focus B while the inner portion thereof is brought into focus C.

In portion (a) of FIG. 15, spherical aberration does not occur on the information surface 329 of the optical disc 320, so that the focus B of the outer portion of the light beam and the focus C of the inner portion of the light beam share the same position A. In this case, the position A exists on the information surface 329. An equidistant surface from the position A corresponds to the wavefront of the light beam.

However, as shown in portion (b) of FIG. 15, when the thickness of the protection layer 321 is smaller than the optimum value, spherical aberration occurs.

Specifically, the focus B and the focus C are separated from each other and both are displaced from the position A of the information surface 329, i.e., the light beam is defocused. In this case, the wavefront of the light beam does not correspond to the equidistant surface from the position A. In this case, an FE signal is generated irrespective of the outer and inner portions of the light beam, and focus control is performed in a manner which causes the FE signal to be substantially zero. Therefore, the position A indicating the focus position of the whole light beam is located on the information surface 329.

In portion (b) of FIG. 15, solid lines indicate the inner and outer portions of a light beam when spherical aberration occurs, while broken lines indicate the inner and outer portions of a light beam when spherical aberration does not occur.

Also, when the thickness of the protection layer 321 ranging from a surface of the optical disc 320 to the information surface 329 is greater than the optimum value, the focus B and the focus C are separated from each other and both are displaced from the position A of the information surface 329, i.e., the light beam is defocused, in a manner similar to that shown in portion (b) of FIG. 15.

Thus, particularly when an optical lens having a large numerical aperture (NA) of 0.8 or more is used, spherical aberration, which occurs due to the uneven thickness of a protection layer for protecting the information surface of an optical disc and errors in the distance between the surface of a multi-layer optical disc and the information surface of each layer, is not negligible. In order to remove the influence of such spherical aberration, a method for switching the levels of correction of spherical aberration so as to achieve a multi-layer structure has been proposed.

In the optical disc apparatus 300, when spherical aberration occurs, spherical aberration is corrected by changing the distance between the concave lens 315a and the convex lens 315b to modify the outer and inner portions of a light beam.

According to the above-described conventional technique, an objective lens is tilted so that coma aberration which occurs in a light beam spot due to the warp of an optical disc can be canceled.

However, in the conventional technique, when the objective lens is tilted so as to cancel coma aberration, spherical aberration occurs due to the tilt of the objective lens in addition to that which occurs due to influences, such as the uneven thickness of the protection layer of a disc or the like.

Therefore, even if coma aberration is canceled by the lens tilt control, additional spherical aberration is caused by the lens tilt control. As a result, recording/reproduction performance is lowered.

SUMMARY OF THE INVENTION

According to an aspect of the present invention, an optical disc apparatus comprises: an objective lens for focusing a light beam on an information surface of an optical disc, the optical disc being at least reproduced optically; an objective lens moving section for moving the objective lens in relation to the information surface; a focus error signal generating section for generating a focus error signal indicating a focused state of the light beam focused on the information surface; a focus control section for controlling the objective lens moving section to focus the light beam on the information surface in accordance with the focus error signal; a lens tilting section for tilting the objective lens to correct coma aberration occurring in a light beam spot focused on the information surface; a spherical aberration correcting section for correcting spherical aberration occurring in the light beam spot focused on the information surface; and a lens tilt-spherical aberration correction control section for controlling the spherical aberration correcting section to change an amount of spherical aberration correction performed by the spherical aberration correcting section depending on a tilt of the objective lens tilted by the lens tilting section.

In one embodiment of this invention, the lens tilt-spherical aberration correction control section may obtain the spherical aberration correction amount depending on the tilt of the objective lens, using a predetermined function indicating a correspondence between the tilt of the objective lens and the spherical aberration correction amount.

In one embodiment of this invention, the lens tilt-spherical aberration correction control section may comprise a non-volatile memory in which the predetermined function is written.

In one embodiment of this invention, the lens tilt-spherical aberration correction control section may obtain the spherical aberration correction amount depending on the tilt of the objective lens, using a table indicating a correspondence between the tilt of the objective lens and the spherical aberration correction amount.

In one embodiment of this invention, the lens tilt-spherical aberration correction control section may comprise a non-volatile memory in which the table is written.

In one embodiment of this invention, the lens tilting section may tilt the objective lens within a limited range.

In one embodiment of this invention, the lens tilting section may tilt the objective lens depending on the tilt of the optical disc.

In one embodiment of this invention, the lens tilting section may tilt the objective lens depending on a change in the tilt of the optical disc.

According to another aspect of the present invention, an optical disc apparatus comprises: an objective lens for focusing a light beam on an information surface of an optical disc, the optical disc being at least reproduced optically; an objective lens moving section for moving the objective lens in relation to the information surface; a focus control section for controlling the objective lens moving section to focus the light beam on the information surface; a light receiving section for receiving the light beam reflected from the optical disc; a lens tilting section for tilting the objective lens to correct coma aberration occurring in a light beam spot focused on the information surface; and a lens tilt-spherical aberration correction amount determining section for determining an amount of correction of spherical aberration occurring in the light beam spot focused on the information surface, depending on a tilt of the objective lens tilted by the lens tilting section.

In one embodiment of this invention, the lens tilt-spherical aberration correction amount determining section may comprise: a calibration signal generator for generating a calibration signal for calibrating the spherical aberration; and a spherical aberration correction amount determining section for determining the spherical aberration correction amount depending on the tilt of the objective lens tilted by the lens tilt section based on calibration the signal.

In one embodiment of this invention, the calibration signal generator may comprise a tracking error signal generating section for generating a tracking error signal indicating an error amount between the light beam spot and a track on the information surface. The spherical aberration correction amount determining section may determine the spherical aberration correction amount based on an amplitude of the tracking error signal.

In one embodiment of this invention, the calibration signal generator may generate a signal indicating a quality of a signal reproduced from the optical disc. The spherical aberration correction amount determining section may determine the spherical aberration correction amount based on the signal indicating the quality of the reproduced signal.

In one embodiment of this invention, the signal indicating the quality of the reproduced signal may be a jitter of the reproduced signal. The spherical aberration correction amount determining section may determine the spherical aberration correction amount based on the jitter.

In one embodiment of this invention, the signal indicating the quality of the reproduced signal may be an amplitude of the reproduced signal. The spherical aberration correction amount determining section may determine the spherical aberration correction amount based on the amplitude of the reproduced signal.

In one embodiment of this invention, the signal indicating the quality of the reproduced signal may be the number of errors or an error rate of information reproduced from the optical disc. The spherical aberration correction amount determining section may determine the spherical aberration correction amount based on the number of errors or the error rate.

In one embodiment of this invention, the calibration signal generator may further comprise a spherical aberration signal generator for generating a spherical aberration signal indicating the spherical aberration. The spherical aberration correction amount determining section may determine the spherical aberration correction amount based on the spherical aberration signal.

In one embodiment of this invention, the light receiving section may comprise: an inner portion light receiving section for receiving an inner portion of the light beam reflected from the optical disc; and an outer portion light receiving section for receiving an outer portion of the light beam reflected from the optical disc. The spherical aberration correction amount determining section may determine the spherical aberration correction amount based on an amount of light received by the inner portion light receiving section and an amount of light received by the outer portion light receiving section.

According to another aspect of the present invention, a spherical aberration correction controlling apparatus is provided for controlling a spherical aberration correcting section for correcting spherical aberration occurring in a light beam spot focused on an information surface of an optical disc by an objective lens. The apparatus comprises: a tilt control section for controlling a tilt of the objective lens to correct coma aberration occurring in the light beam spot focused on the information surface; and a lens tilt-spherical aberration correction control section for controlling the spherical aberration correcting section to change an amount of spherical aberration correction performed by the spherical aberration correcting section depending on the tilt of the objective lens controlled by the tilt control section.

Thus, the invention described herein makes possible the advantage of providing an optical disc apparatus and a spherical aberration correction controlling apparatus, in which spherical aberration caused by the tilt of an objective lens is corrected, thereby making it possible to prevent a reduction in recording/reproduction performance and obtain a high level of reliability.

These and other advantages of the present invention will become apparent to those skilled in the art upon reading and understanding the following detailed description with reference to the accompanying figures.

BRIEF DESCRIPTION OF THE DRAWINGS

FIG. 1D is a cross-sectional view schematically showing a light receiving section and components therearound in the optical disc apparatus of FIG. 1C in greater detail.

DESCRIPTION OF THE PREFERRED EMBODIMENTS

Hereinafter, the present invention will be described by way of illustrative examples with reference to the accompanying drawings.

Embodiment 1

Figure 1A:
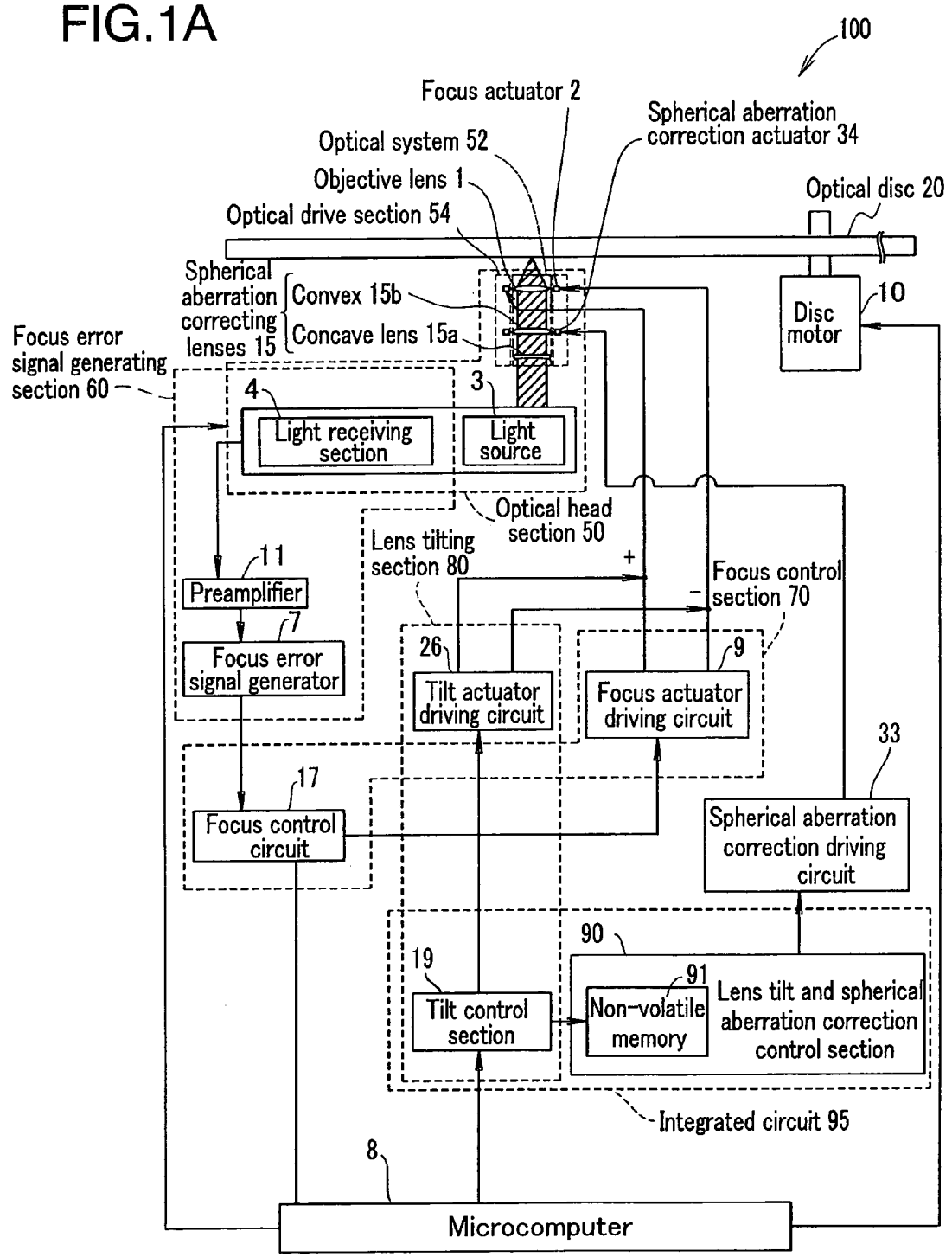
FIG. 1A is a block diagram showing an optical disc apparatus according to Embodiment 1 of the present invention.

FIG. 1A is a block diagram showing an optical disc apparatus 100 according to Embodiment 1 of the present invention.

The optical disc apparatus 100 records information to an optical disc 20 and/or reproduces information from the optical disc 20.

The optical disc 20 comprises an information surface for recording information (not shown in FIG. 1A) and a protection layer (not shown in FIG. 1A) for protecting the information surface, the protection layer being provided on the information surface. In addition, tracks are provided on the information surface of the optical disc 20.

The optical disc apparatus 100 comprises: a disc motor 10 for rotating the optical disc 20 loaded thereon at a predetermined rpm; an optical head section 50; a focus error signal generating section 60 for generating a focus error signal; a focus control section 70 for controlling the focus of a light beam based on the focus error signal; a lens tilting section 80 for tilting an objective lens 1 depending on the tilt of the optical disc 20; a spherical aberration correction driving circuit 33 which serves as a spherical aberration correcting section for correcting spherical aberration occurring in a light beam spot focused on the information surface of the optical disc 20; a lens tilt-spherical aberration correction control section 90 for controlling the spherical aberration correction driving circuit 33 in a manner which changes an amount of correction performed by the spherical aberration correction driving circuit 33 depending on the tilt of the objective lens 1 of the optical head section 50; and a microcomputer 8.

The optical head section 50 comprises a light source 3, such as a semiconductor laser or the like, which serves as a light beam generating section; a light receiving section 4 for receiving a light beam which is output from the light source 3 and is thereafter reflected from the optical disc 20; an optical system 52; and an optical drive section 54 for driving the optical system 52.

The optical system 52 comprises an objective lens 1 and a pair of spherical aberration correcting lenses 15.

The spherical aberration correcting lenses 15 are a concave lens 15a and a convex lens 15b. Note that the concave lens 15a and the convex lens 15b may be arranged in a manner different from that shown in FIG. 1A.

The optical drive section 54 comprises: a focus actuator 2 for moving the objective lens 1 in relation to the information surface of the optical disc 20; and a spherical aberration correcting actuator 34 for driving the spherical aberration correcting lenses 15 in a manner which changes a distance between the concave lens 15a and the convex lens 15b to prevent the occurrence of spherical aberration. The focus actuator 2 serves as an objective lens moving section for moving the objective lens 1.

The focus error signal generating section 60 comprises the light receiving section 4, a preamplifier 11, and a focus error signal generator 7.

The focus control section 70 comprises a focus control circuit 17 and a focus actuator driving circuit 9.

The lens tilting section 80 comprises: a tilt control section 19 for generating a tilt control signal in accordance with a command output from the microcomputer 8; and a tilt actuator driving circuit 26 for driving the focus actuator 2 based on the tilt control signal.

The lens tilt-spherical aberration correction control section 90 comprises a non-volatile memory 91, in which a correspondence between the tilt of the objective lens 1 and the amount of spherical aberration correction is written in advance.

The lens tilt-spherical aberration correction control section 90 changes the amount of spherical aberration correction performed by the spherical aberration correction driving circuit 33 depending on the tilt of the objective lens 1 indicated by the tilt control signal.

The tilt control section 19 and the lens tilt-spherical aberration correction control section 90 may be preferably integrated into an integrated circuit 95 (e.g., an LSI).

The integrated circuit 95 serves as a spherical aberration correction controlling apparatus for controlling the spherical aberration correction driving circuit 33.

Note that the integrated circuit 95 may further comprise the focus control circuit 17.

In addition, the preamplifier 11 and the focus error signal generator 7 may be integrated together into another separate integrated circuit. The microcomputer 8 may be fabricated as another separate integrated circuit. These integrated circuits may constitute the optical disc apparatus 100.

The microcomputer 8 controls the disc motor 10, the optical head section 50, the focus control section 70, and the lens tilting section 80.

The microcomputer 8 controls the optical head section 50 in a manner which allows the optical head section 50 to move to a desired position in a radial direction of the optical disc 20 in order to record information to the desired position or reproduce information from the desired position.

The microcomputer 8 also adjusts the height of the objective lens 1 so that a distance between the objective lens 1 and the information surface of the optical disc 20 is maintained to be a predetermined value even when the optical disc 20 is tilted (this operation is also referred to as focus control).

The focus control performed by the optical disc apparatus 100 will be described below.

A light beam output from the light source 3 is focused by the objective lens 1 onto the information surface of the optical disc 20, thereby forming a light beam spot. At the light beam spot, the light beam is reflected from the optical disc 20. The reflected light beam passes through the objective lens 1 again and is thereafter input to the light receiving section 4.

The light receiving section 4 has four separate regions. Each region generates a photocurrent, the amount of which depends on the amount of light received by the region. The light receiving section 4 outputs the generated photocurrent to the preamplifier 11.

The preamplifier 11 serves as an I/V converter to convert the photocurrent into a voltage. The preamplifier 11 outputs a voltage signal, which has been converted from a current signal, to the focus error signal generator 7.

The focus error signal generator 7 generates a focus error signal indicating a deviation (error) of the light beam spot from a direction perpendicular to the optical disc 20 based on the four signals output from the preamplifier 11. Hereinafter, the focus error signal is also referred to as an FE signal.

For example, the focus error signal generator 7 uses an astigmatism correction method to generate an FE signal. The focus error signal generator 7 outputs the generated FE signal to the focus control circuit 17.

The focus control circuit 17 subjects the FE signal to filter operations, such as phase compensation, gain compensation, or the like. Thereafter, the focus control circuit 17 outputs the FE signal to the focus actuator driving circuit 9.

The focus actuator driving circuit 9 generates a drive signal based on the FE signal output from the focus control circuit 17, and outputs the generated drive signal to the focus actuator 2.

The focus actuator 2 moves the objective lens 301 in a direction substantially perpendicular to the information surface of the optical disc 20 based on the drive signal output from the focus actuator driving circuit 9, thereby changing the focused position of the light beam.

The focus control circuit 17 controls the focus actuator driving circuit 9 in a manner which causes the FE signal generated by the focus error signal generator 7 to be substantially zero. As a result, the light beam spot is in focus to a predetermined level on the information surface of the optical disc 20. In this manner, focus control is achieved.

In the optical disc apparatus 160, the microcomputer 8 determines the amount of tilt of the optical disc 20.

The amount of tilt can be determined using several techniques. Hereinafter, for example, a technique for determining the amount of tilt from the height of the objective lens 1 will be described. The present invention is not limited to this technique.

Hereinafter, the amount of tilt of the optical disc 20 will be described.

Figure 1B:
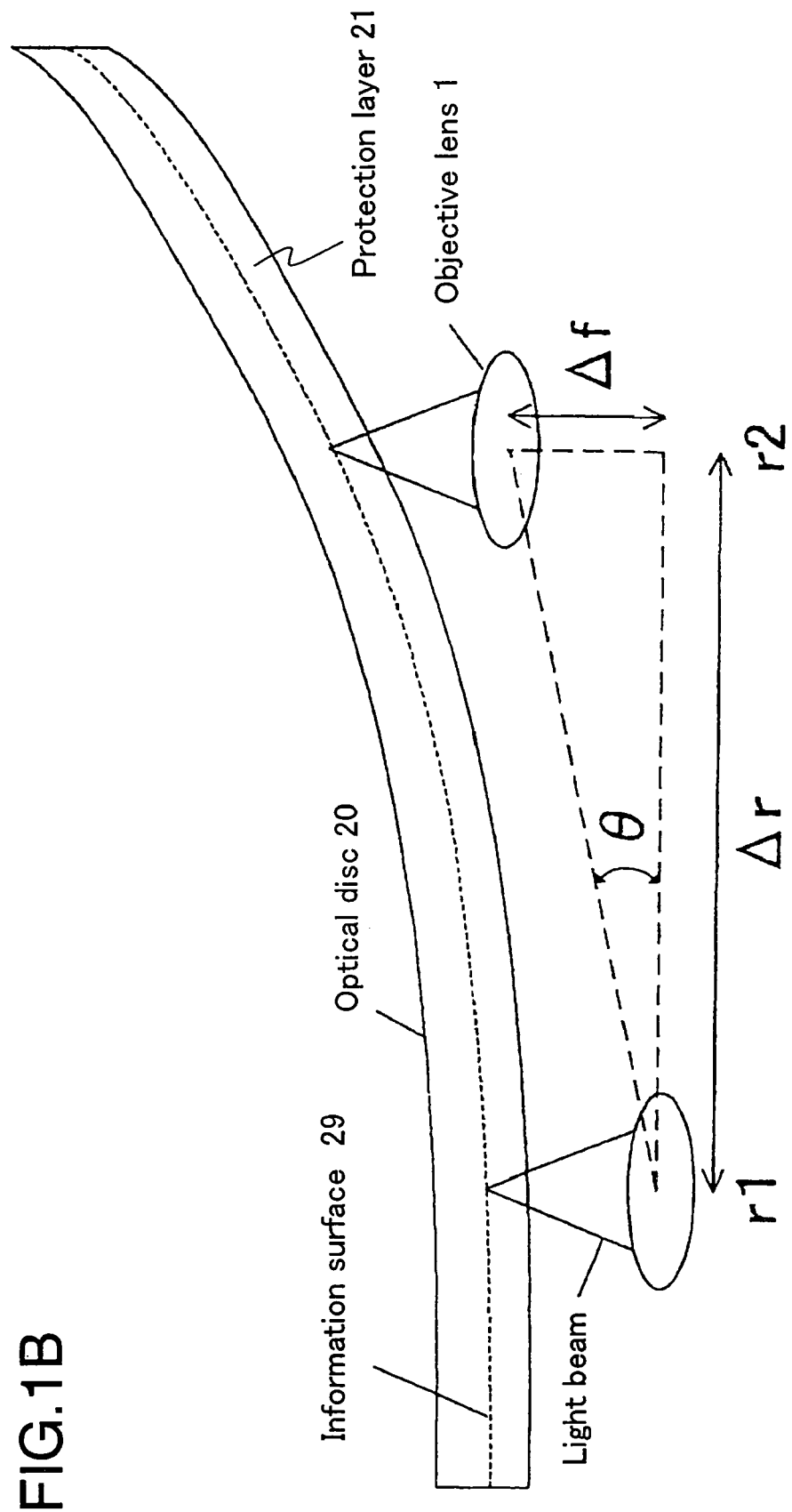
FIG. 1B is a schematic diagram showing an optical disc and an objective lens for explaining the determination of the amount of tilt.

FIG. 1B is a schematic diagram showing the optical disc 20 and the objective lens 1 for explaining the determination of the amount of tilt.

As described above, the microcomputer 8 controls the optical head section 50 in a manner which moves the objective lens 1 to a position of radius r1 and a position of radius r2.

By focus control, the distance between the objective lens 1 and an information surface 29 of the optical disc 20 is maintained to be a predetermined value at each of the position of radius r1 and the position of radius r2.

Now it is assumed that the optical disc 20 is tilted due to warp, imperfect loading, or the like. In this case, the microcomputer 8 performs focus control at each of the position of radius r1 and the position of radius r2, so that the height of the objective lens 1 at radius r2 is greater than at radius r1.

When the microcomputer 8 detects a difference Δf in the height of the objective lens 1 between the position of radius r1 and at radius r2, and a difference amount Δr between radius r1 and the position of radius r2, the amount of tilt θ in a radial direction of the optical disc 20 can be determined by the following expression:

$$\theta = \tan^{-1}(\Delta f/\Delta r)$$

where $\tan^{-1}$ represents arc tangent.

Thus, the microcomputer 8 determines the amount of tilt of the optical disc 20 based on the position of the optical head section 50 and the height of the objective lens 1.

The microcomputer 8 outputs a command which instructs the tilt control section 19 to perform lens tilt control based on the determined amount of tilt of the optical disc 20.

In accordance with the command output from the microcomputer 8, the tilt control section 19 generates a tilt control signal for controlling the tilt of the objective lens 1. The tilt control signal indicates an amount of tilt, by which the objective lens 1 needs to be tilted so as to cancel coma aberration caused by the tilt of the optical disc 20. Hereinafter, the tilt of the objective lens 1 for canceling coma aberration is also simply referred to as a lens tilt.

The tilt control section 19 outputs a tilt control signal to the tilt actuator driving circuit 26.

The tilt actuator driving circuit 26 applies offset signals having different polarities to two drive signals output from the focus actuator driving circuit 9 based on the tilt control signal. In other words, the tilt actuator driving circuit 26 makes a predetermined difference between the two drive signals output from the focus actuator driving circuit 9.

With the offset signals from the tilt actuator driving circuit 26, one side of the objective lens 1 is lowered, while the other side thereof is raised. Thus, the objective lens 1 is tilted depending on the tilt of the optical disc 20, thereby making it possible to cancel coma aberration, which is attributed to the tilt of the information surface of the optical disc 20.

The tilt control section 19 also outputs a tilt control signal to the lens tilt-spherical aberration correction control section 90.

The lens tilt-spherical aberration correction control section 90 determines the tilt of the objective lens 1 indicated by the tilt control signal, i.e., determines the amount of correction of spherical aberration depending on the lens tilt. Hereinafter, the amount of correction of spherical aberration is also referred to as a spherical aberration correction amount. The spherical aberration correction amount is determined in advance to be a value such that spherical aberration does not occur in a light beam spot on the information surface 29 of the optical disc 20 when the objective lens 1 is tilted.

The lens tilt-spherical aberration correction control section 90 calculates a spherical aberration correction amount based on the tilt of the objective lens 1 indicated by the tilt control signal. Specifically, the calculation may be performed using a predetermined characteristic function or a predetermined conversion table indicating a correspondence between a tilt of the objective lens 1 and a spherical aberration correction amount, for example.

The lens tilt-spherical aberration correction control section 90 generates a spherical aberration correction signal indicating a spherical aberration correction amount based on the tilt control signal output from the tilt control section 19, and outputs the generated spherical aberration correction signal to the spherical aberration correction driving circuit 33.

The spherical aberration correction driving circuit 33 generates a drive signal based on the spherical aberration correction signal, and outputs the generated drive signal to the spherical aberration correcting actuator 34.

The spherical aberration correcting actuator 34 drives the spherical aberration correcting lenses 15 based on the drive signal. The spherical aberration correcting actuator 34 changes a distance between the concave lens 15a and the convex lens 15b (spherical aberration correcting lenses 15) based on the drive signal output from the spherical aberration correction driving circuit 33 to correct spherical aberration.

Specifically, the outer and inner portions of a light beam are modified by changing the distance between the concave lens 15a and the convex lens 15b. As the distance between the concave lens 15a and the convex lens 15b (spherical aberration correcting lenses 15) is decreased, the focal distance of the inner portion of a light beam increases while the focal distance of the outer portion of the light beam decreases. Conversely, as the distance between the concave lens 15a and the convex lens 15b is increased, the focal distance of the inner portion of a light beam decreases while the focal distance of the outer portion of the light beam increases.

Hereinafter, the following two techniques for obtaining a spherical aberration correction amount based on a lens tilt in the lens tilt-spherical aberration correction control section 90 will be described: (1) a technique employing a predetermined characteristic function; and (2) a technique employing a predetermined conversion table.

Firstly, (1) the technique employing a predetermined characteristic function will be described below.

Figure 2:
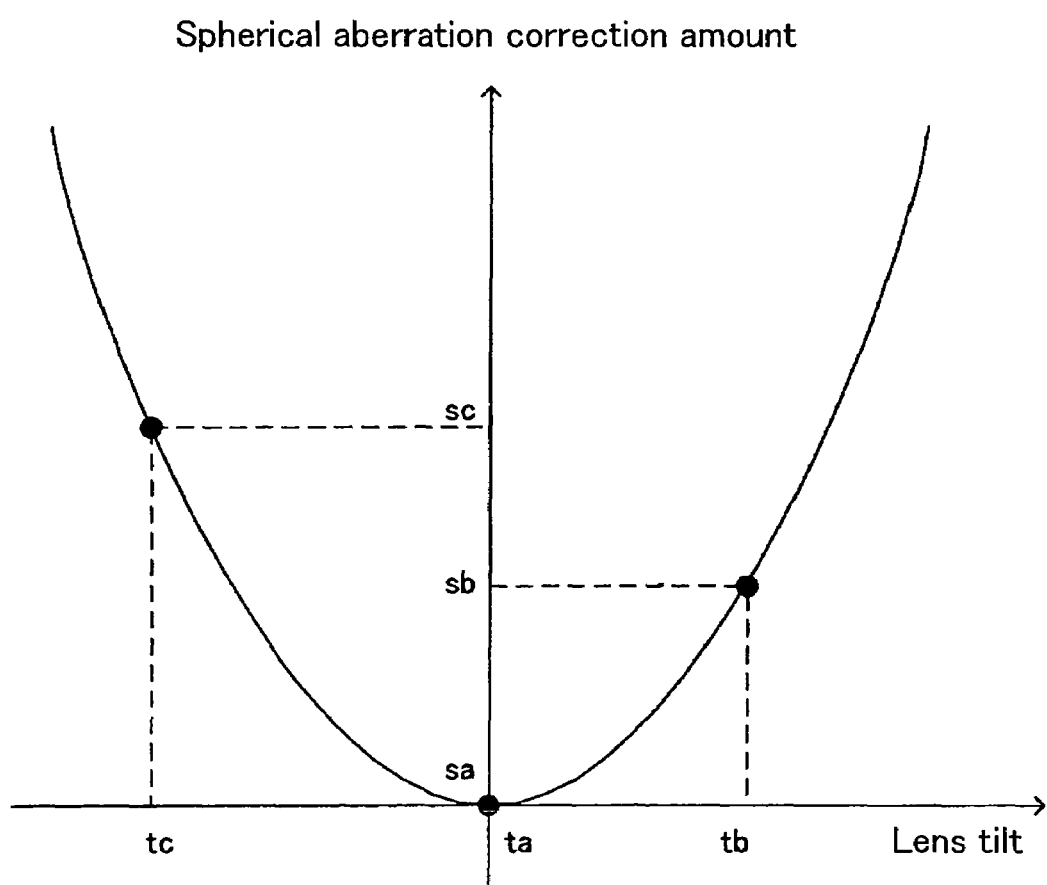
FIG. 2 is a graph showing a function for obtaining a spherical aberration correction amount based on a lens tilt in a lens tilt-spherical aberration correction control section of the optical disc apparatus of FIG. 1A.

FIG. 2 is a graph showing a function for obtaining a spherical aberration correction amount based on a lens tilt, which is used in the lens tilt-spherical aberration correction control section 90 of the optical disc apparatus 100 of FIG. 1A. In the graph of FIG. 2, the vertical axis represents a spherical aberration correction amount while the horizontal axis represents a lens tilt.

The function of the graph of FIG. 2 is a function of fourth order or less represented by:

$$y = a \cdot x^4 + b \cdot x^3 + c \cdot x^2 + d \cdot x + e.$$

where y represents a spherical aberration correction amount, and x represents a lens tilt indicated by a tilt control signal.

In FIG. 2, when the lens tilt is ta, the spherical aberration correction amount is sa. When the lens tilt is tb, the spherical aberration correction amount is sb. When the lens tilt is tc, the spherical aberration correction amount is sc.

Figure 3:
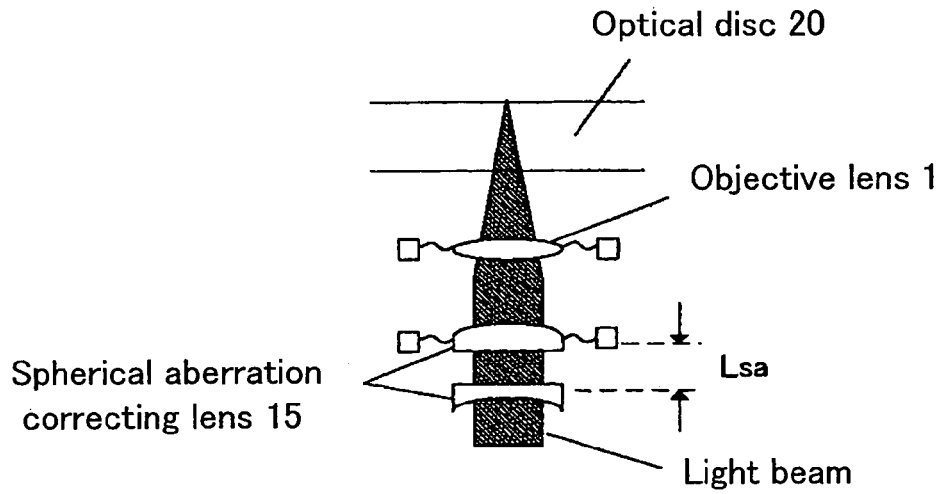
FIG. 3 is a schematic diagram showing a relationship between a lens tilt and a spherical aberration correction amount in the optical disc apparatus of FIG. 1A.
Figure 3:
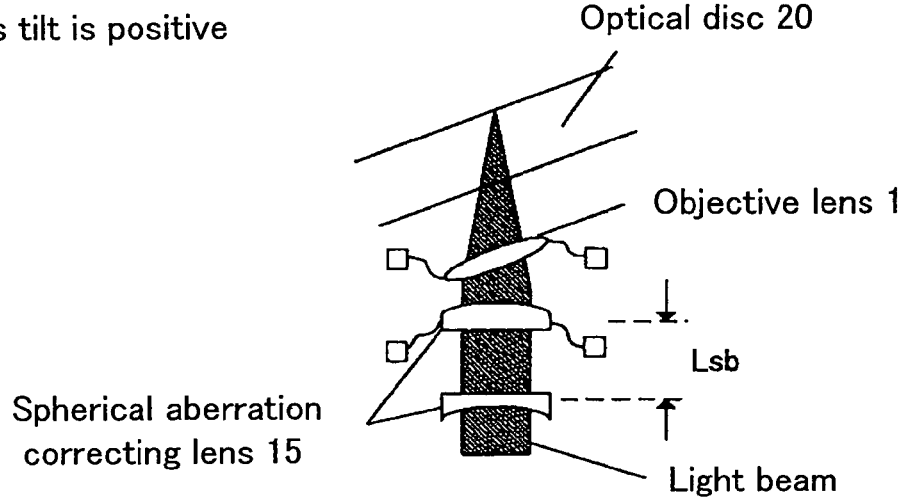
Figure 3:
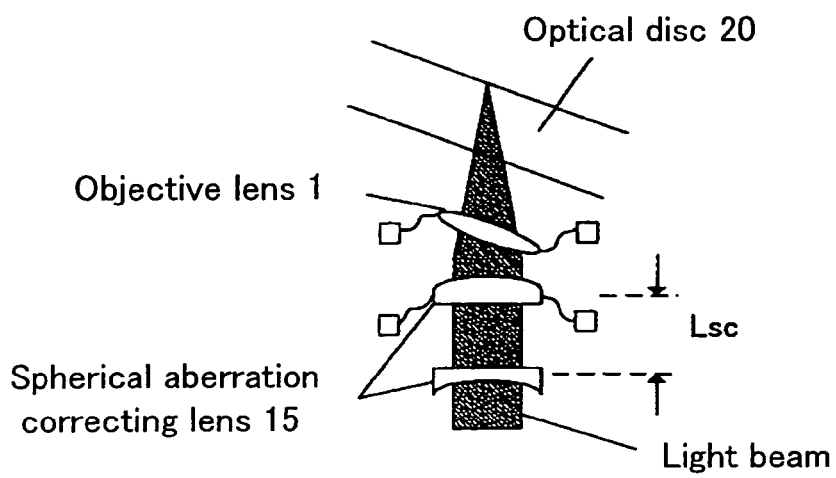

FIG. 3 is a schematic diagram showing a relationship between a lens tilt and a spherical aberration correction amount in the optical disc apparatus 100 of FIG. 1A.

When the optical disc 20 is not tilted, i.e., the lens tilt is zero, x=ta. In this case, the lens tilt-spherical aberration correction control section 90 calculates the following expression in accordance with the characteristic function of FIG. 2:

$$a \cdot ta^4 + b \cdot ta^3 + c \cdot ta^2 + d \cdot ta + e.$$

As a result, the spherical aberration correction amount sa corresponding to the lens tilt ta is obtained.

In this case, a spherical aberration correction signal output from the lens tilt-spherical aberration correction control section 90 indicates the spherical aberration correction amount sa.

In this case, as shown in portion (a) of FIG. 3, the distance between the concave lens 15a and the convex lens 15b is Lsa. The objective lens 1 is perpendicular to a light beam.

When the lens tilt is positive (e.g., x=tb), the lens tilt-spherical aberration correction control section 90 calculates the following expression in accordance with the characteristic function of FIG. 2:

$$a \cdot tb^4 + b \cdot tb^3 + c \cdot tb^2 + d \cdot tb + e.$$

As a result, the spherical aberration correction amount sb corresponding to the lens tilt tb is obtained.

In this case, a spherical aberration correction signal output from the lens tilt-spherical aberration correction control section 90 indicates the spherical aberration correction amount sb.

In this case, as shown in portion (b) of FIG. 3, the objective lens 1 is tilted and deviated from a direction perpendicular to a light beam. The distance between the concave lens 15a and the convex lens 15b is adjusted to be Lsb in order to remove spherical aberration which occurs depending on the tilt of the objective lens 1. Lsb is calculated by:

$$Lsb = Lsa + kx(sb - sa)$$

where k represents a coefficient of conversion from the spherical aberration correction amount to the distance between the spherical aberration correcting lenses 15.

When the lens tilt is negative (e.g., x=tc), the lens tilt-spherical aberration correction control section 90 calculates the following expression in accordance with the characteristic function of FIG. 2:

$$a \cdot tc^4 + b \cdot tc^3 + c \cdot tc^2 + d \cdot tc + e.$$

As a result, the spherical aberration correction amount sc corresponding to the lens tilt tc is obtained.

In this case, a spherical aberration correction signal output from the lens tilt-spherical aberration correction control section 90 indicates the spherical aberration correction amount sc.

In this case, as shown in portion (b) of FIG. 3, the objective lens 1 is tilted and deviated from the direction perpendicular to the light beam. The distance between the concave lens 15a and the convex lens 15b is adjusted to be Lsc in order to remove spherical aberration which occurs depending on the tilt of the objective lens 1. Lsc is calculated by:

$$Lsc = Lsa + kx(sc - sa)$$

where k represents a coefficient of conversion from the spherical aberration correction amount to the distance between the spherical aberration correcting lenses 15.

Next, (2) the technique using a predetermined conversion table will be described.

Figures 4, 5:
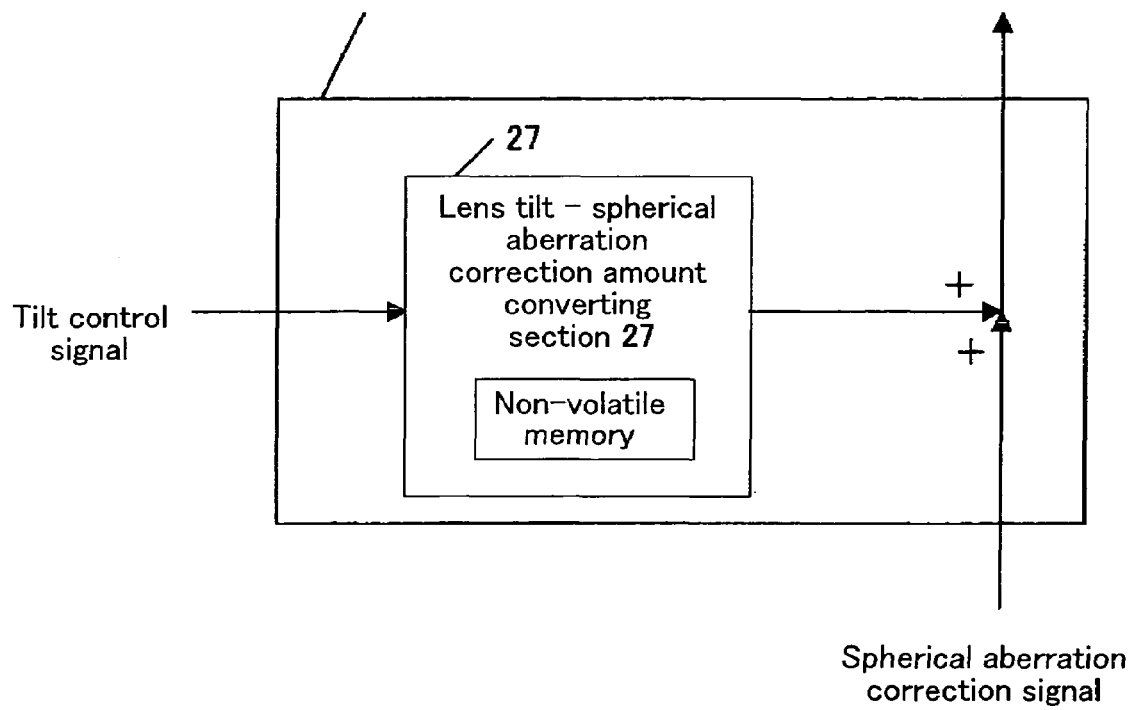
FIG. 4 is a table showing a correspondence between a lens tilt and a spherical aberration correction amount in the lens tilt-spherical aberration correction control section of the optical disc apparatus of FIG. 1A.
FIG. 5 is a block diagram showing a lens tilt-spherical aberration correction amount association section of FIG. 1C.

FIG. 4 is a table showing a correspondence between a lens tilt and a spherical aberration correction amount in the lens tilt-spherical aberration correction control section 90 of the optical disc apparatus 100 of FIG. 1A.

The first row of the table of FIG. 4 indicates lens tilts while the second row thereof indicates spherical aberration correction amounts.

When the optical disc 20 is not tilted, i.e., a lens tilt is zero, the lens tilt is represented by ta. The lens tilt-spherical aberration correction control section 90 obtains a spherical aberration correction amount sa corresponding to the lens tilt ta from the table of FIG. 4.

In this case, a spherical aberration correction signal output from the lens tilt-spherical aberration correction control section 90 indicates the spherical aberration correction amount sa.

In this case, as shown in portion (a) of FIG. 3, the distance between the concave lens 15a and the convex lens 15b is Lsa. The objective lens 1 is perpendicular to a light beam.

When the lens tilt is positive (e.g., the lens tilt istb), the lens tilt-spherical aberration correction control section 90 obtains a spherical aberration correction amount sb corresponding to the lens tilt tb from the table of FIG. 4.

In this case, a spherical aberration correction signal output from the lens tilt-spherical aberration correction control section 90 indicates the spherical aberration correction amount sb.

In this case, as shown in portion (b) of FIG. 3, the objective lens 1 is tilted and deviated from the direction perpendicular to a light beam. The distance between the concave lens 15a and the convex lens 15b is adjusted to be Lsb in order to remove spherical aberration which occurs depending on the tilt of the objective lens 1. Lsb is calculated by:

$$Lsb = Lsa + kx(sb - sa)$$

where k represents a coefficient of conversion from the spherical aberration correction amount to the distance between the spherical aberration correcting lenses 15.

When the lens tilt is negative (e.g., the lens tilt is tc), the lens tilt-spherical aberration correction control section 90 obtains a spherical aberration correction amount sc corresponding to the lens tilt tc from the table of FIG. 4.

In this case, a spherical aberration correction signal output from the lens tilt-spherical aberration correction control section 90 indicates the spherical aberration correction amount sc.

In this case, as shown in portion (b) of FIG. 3, the objective lens 1 is tilted and deviates from the direction perpendicular to the light beam. The distance between the concave lens 15a and the convex lens 15b is adjusted to be Lsc in order to remove spherical aberration which occurs due to the tilt of the objective lens 1. Lsc is calculated by:

$$Lsc = Lsa + kx(sc - sa)$$

where k represents a coefficient of conversion from the spherical aberration correction amount to the distance between the spherical aberration correcting lenses 15.

When a lens tilt indicated by a tilt control signal output from the tilt control section 19 is not found in the table (e.g., the lens tilt indicated by the tilt control signal has a value between the lens tilt ta and the lens tilt tb), the lens tilt-spherical aberration correction control section 90 may interpolate a spherical aberration correction amount between the spherical aberration correction amount sa and the spherical aberration correction amount sb, and output a spherical aberration correction signal indicating the interpolated spherical aberration correction amount to the spherical aberration correction driving circuit 33.

Alternatively, when a lens tilt indicated by a tilt control signal output from the tilt control section 19 is not found in the table but the lens tilt is close to a certain value in the table (e.g., the lens tilt ta is the closest to the lens tilt indicated by the tilt control signal output from the tilt control section 19), the lens tilt-spherical aberration correction control section 90 may output a spherical aberration correction signal indicating the spherical aberration correction amount sa to the spherical aberration correction driving circuit 33.

As described above, problems attributed to spherical aberration caused by the tilt of the objective lens 1 are solved. According to this embodiment of the present invention, by tilting the objective lens 1, coma aberration occurring in a light beam spot on the information surface of the optical disc 20 is corrected, and spherical aberration caused by the tilt of the objective lens 1 is also corrected. As a result, reproduction and recording can be easily and satisfactorily performed.

As described above, a spherical aberration correction amount is obtained depending only on a lens tilt in the lens tilt-spherical aberration correction control section 90. However, the present invention is not limited to this.

Figure 13:
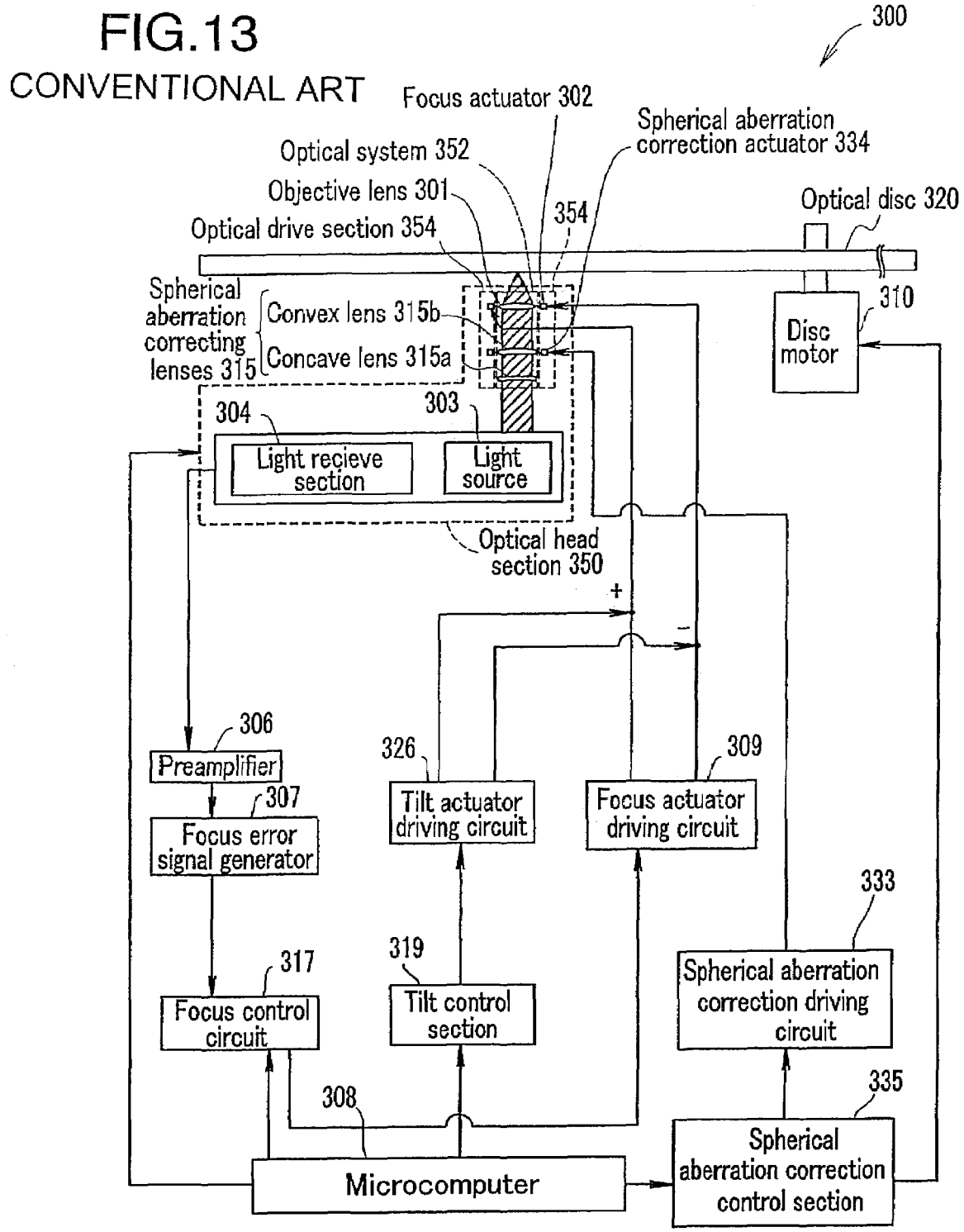
FIG. 13 is a block diagram showing a conventional optical disc apparatus.
Figure 14:
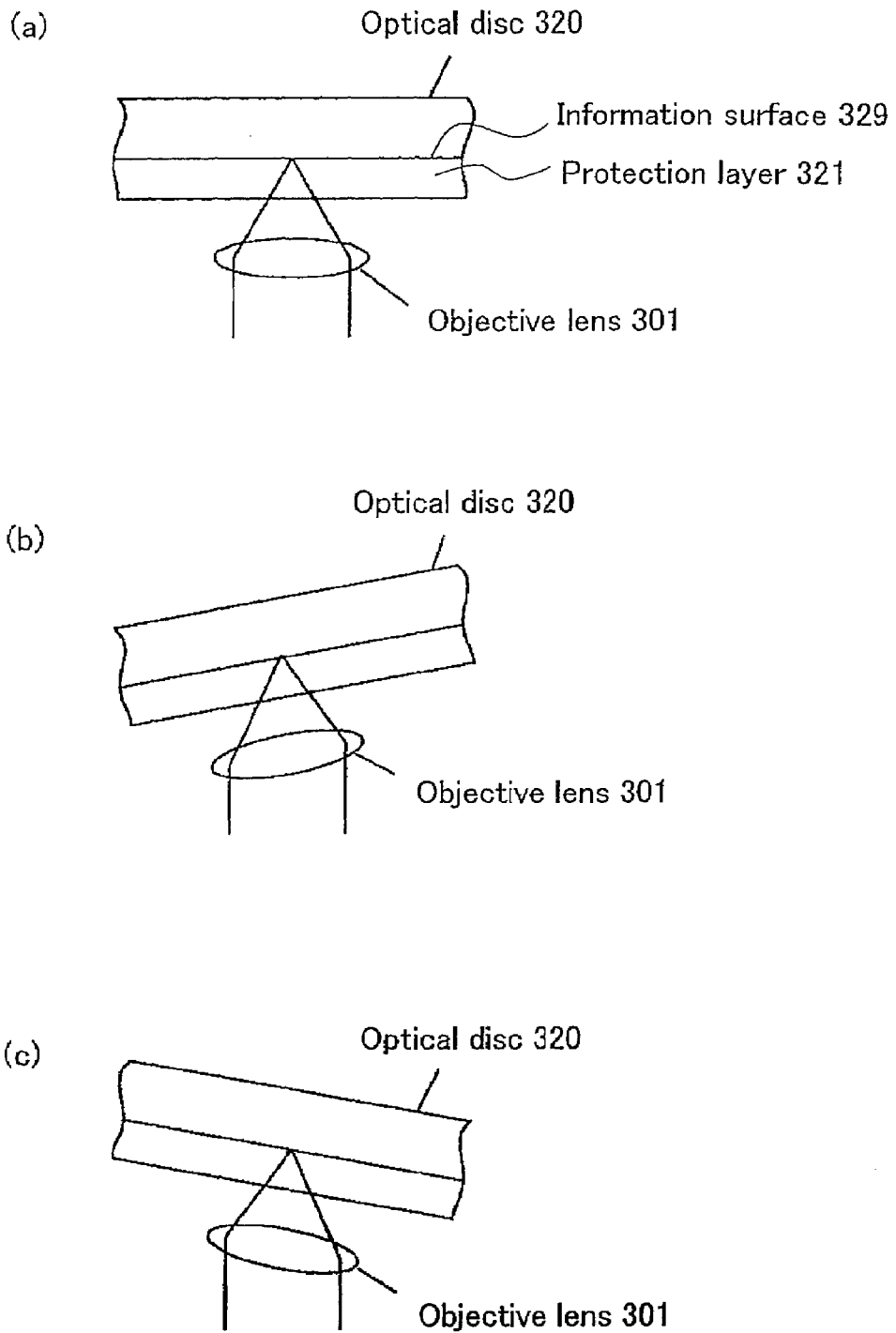
FIG. 14 is a schematic diagram for explaining a relationship between a tilt of an optical disc and lens tilt control.
Figure 15:
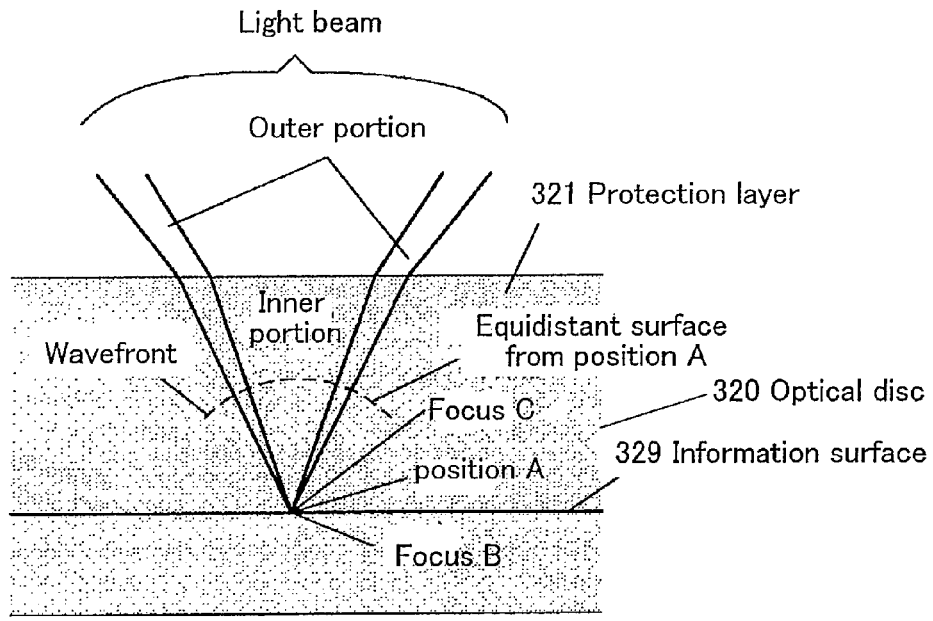
FIG. 15 is a cross-sectional view showing a method for generating a spherical aberration signal.
Figure 15:
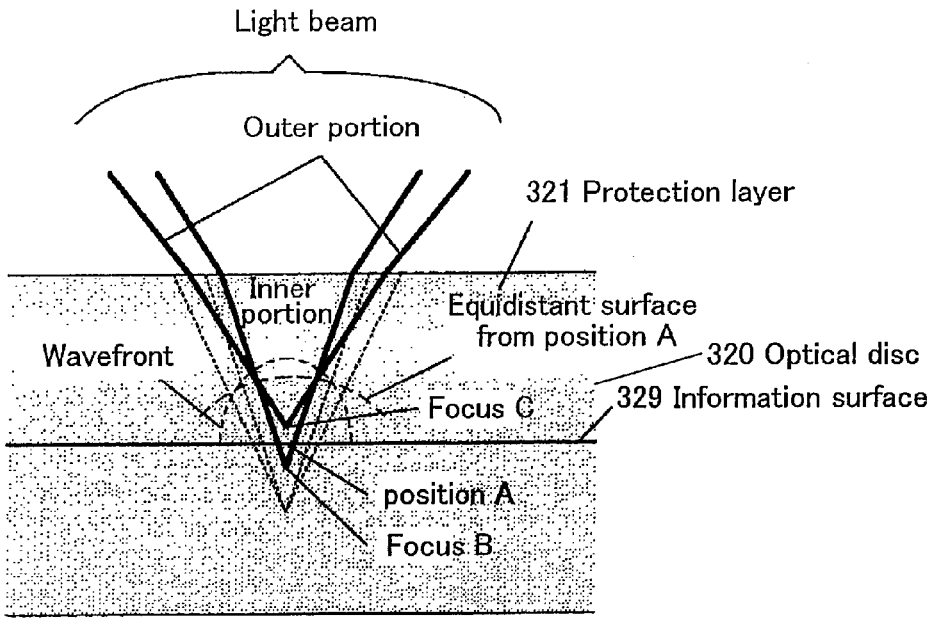

As described above, spherical aberration also occurs due to the uneven thickness of the protection layer for protecting the information surface of an optical disc and errors in the distance from the surface of a multi-layer optical disc to the information surface of each layer. Taking this spherical aberration into consideration, the amount of correction of spherical aberration may be changed in the present invention, as in the conventional optical disc apparatus 300 of FIG. 13.

Figure 1C:
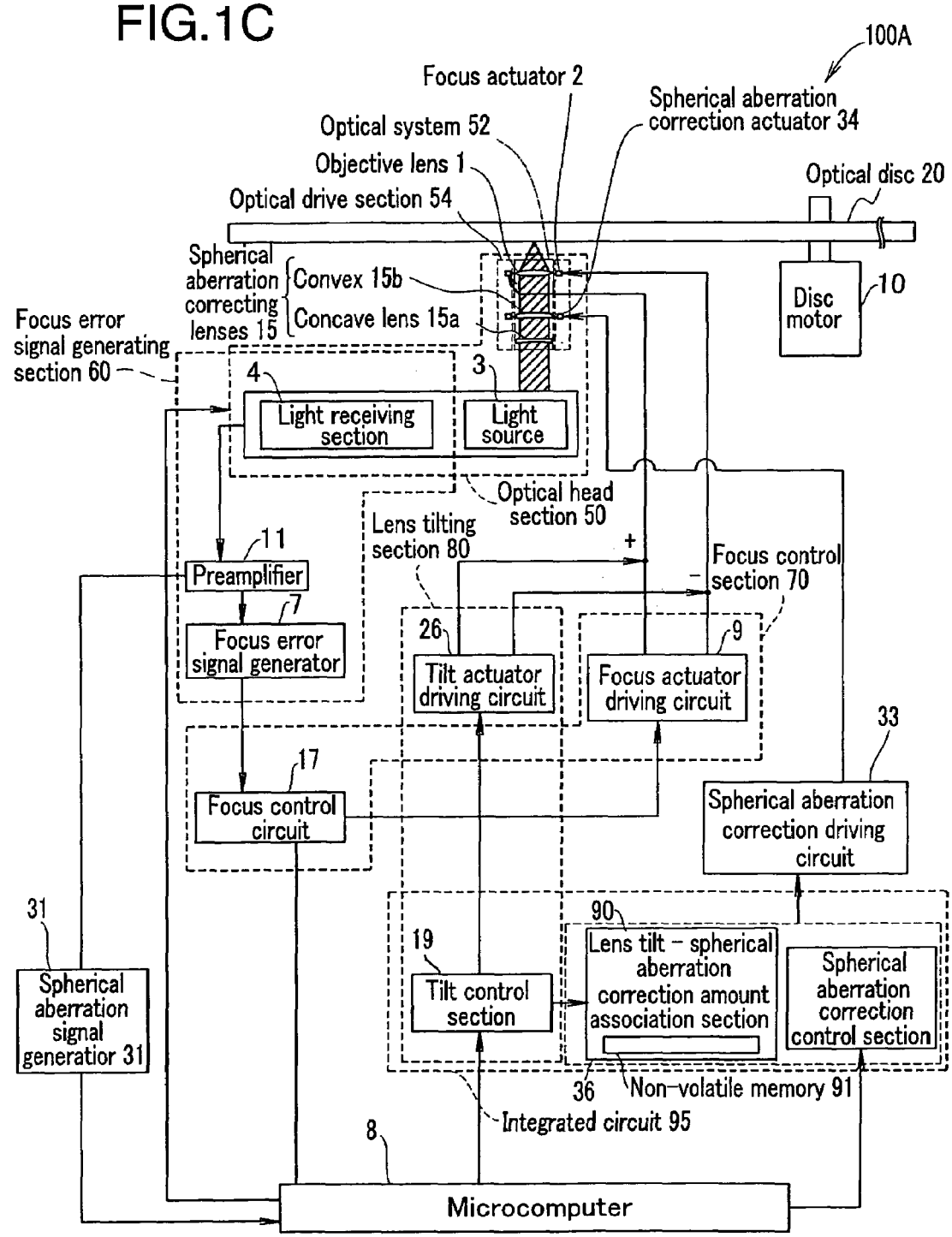
FIG. 1C is a block diagram showing an optical disc apparatus which is a variation of Embodiment 1 of the present invention.

FIG. 1C is a block diagram showing an optical disc apparatus 100A which is a variation of Embodiment 1 of the present invention.

The optical disc apparatus 100A is different from the optical disc apparatus 100 of FIG. 1A in the following points: (1) the lens tilt-spherical aberration correction control section 90 comprises a spherical aberration correction control section 35 and a lens tilt-spherical aberration correction amount association section 36; and (2) the light receiving section 4A comprises an outer portion light receiving section 40 and an inner portion light receiving section 41 (FIG. 1D). The optical disc apparatus 100A further comprises a spherical aberration signal generator 31 (FIG. 1E) for generating a spherical aberration signal based on the results of detection performed by the outer portion light receiving section 40 and the inner portion light receiving section 41.

Parts of the optical disc apparatus 100A having the same functions as those of corresponding parts of the optical disc apparatus 100 are referred to by the same reference characters and the description thereof is omitted for the sake of brevity.

In the optical disc apparatus 100A, the lens tilt-spherical aberration correction control section 90 comprises: the spherical aberration correction control section 35 for generating a spherical aberration correction signal in accordance with a command output from the microcomputer 8; and the lens tilt-spherical aberration correction amount association section 36 for calibrating the spherical aberration correction signal output from the spherical aberration correction control section 35 based on a tilt control signal output from the tilt control section 19.

The lens tilt-spherical aberration correction amount association section 36 comprises a non-volatile memory 91 in which a correspondence between a tilt of the objective lens 1 and a spherical aberration correction amount is written in advance.

In the optical disc apparatus 100A, a light receiving section 4A has eight separate regions. Each region generates a photocurrent, the amount of which depends on the amount of light received by the region. The light receiving section 4A outputs the generated photocurrent to the preamplifier 11.

The preamplifier 11 serves as an I/V converter to convert the photocurrent into a voltage. The preamplifier 11 outputs the voltage signal, which has been converted from the current signal, to the focus error signal generator 7 and the spherical aberration signal generator 31.

The focus error signal generator 7 generates a focus error signal indicating a deviation (error) of the light beam spot from a direction perpendicular to the optical disc 20 based on the eight signals output from the preamplifier 11.

The spherical aberration signal generator 31 generates a spherical aberration signal indicating spherical aberration, which occurs in a light beam spot focused on the information surface of the optical disc 20, based on the eight signals output from the preamplifier 11.

In the optical disc apparatus 100A, the microcomputer 8 outputs a command which instructs the tilt control section 19 to perform predetermined lens tilt control.

The tilt control section 19 generates a tilt control signal in accordance with a command output from the microcomputer 8 and outputs the generated tilt control signal to the tilt actuator driving circuit 26. The tilt control section 19 also outputs the tilt control signal to the lens tilt-spherical aberration correction amount association section 36.

The microcomputer 8 also outputs a command which instructs the spherical aberration correction control section 35 to perform predetermined spherical aberration correction. The spherical aberration correction control section 35 generates a spherical aberration correction signal in accordance with the command output from the microcomputer 8 and outputs the generated spherical aberration correction signal to the lens tilt-spherical aberration correction amount association section 36.

The lens tilt-spherical aberration correction amount association section 36 calibrates the spherical aberration correction signal output from the spherical aberration correction control section 35 based on the tilt control signal, and outputs the calibrated spherical aberration correction signal to the spherical aberration correction driving circuit 33.

The spherical aberration correction driving circuit 33 generates a drive signal based on the spherical aberration correction signal calibrated by the lens tilt-spherical aberration correction amount association section 36, but not based on the spherical aberration correction signal generated by the spherical aberration correction control section 35, and outputs the generated drive signal to the spherical aberration correcting actuator 34.

The spherical aberration correcting actuator 34 drives the spherical aberration correcting lenses 15 based on the drive signal. The spherical aberration correcting actuator 34 changes the distance between the concave lens 15a and the convex lens 15b (spherical aberration correcting lenses 15) based on the drive signal output from the spherical aberration correction driving circuit 33 to correct spherical aberration.

Hereinafter, the generation of a spherical aberration signal by the spherical aberration signal generator 31 in the optical disc apparatus 100A will be described with reference to FIGS. 1D and 1E.

FIG. 1D is a cross-sectional view schematically showing the light receiving section 4A and components therearound in the optical disc apparatus 100A of FIG. 1C.

The light receiving section 4A comprises the outer portion light receiving section 40 and the inner portion light receiving section 41.

A detection lens 46 collects a light beam reflected from the optical disc 20.

A polarized light beam splitter 47 splits the light beam collected by the detection lens 46 into two.

A first light blocking plate 48 blocks an inner portion of one of the two light beams split by the polarized light beam splitter 47. The inner portion is located within a circle having a predetermined radius from the center of the light beam.

The outer portion light receiving section 40 receives a light beam, which has passed the first light blocking plate 48 and converts the received light beam to a photocurrent.

A second light blocking plate 49 blocks an outer portion of the other of the two light beams split by the polarized light beam splitter 47. The outer portion is located outside a circle having a predetermined radius from the center of the light beam.

The inner portion light receiving section 41 receives a light beam, which has passed through the second light blocking plate 49, and converts the received light beam to a photocurrent.

Figure 1E:
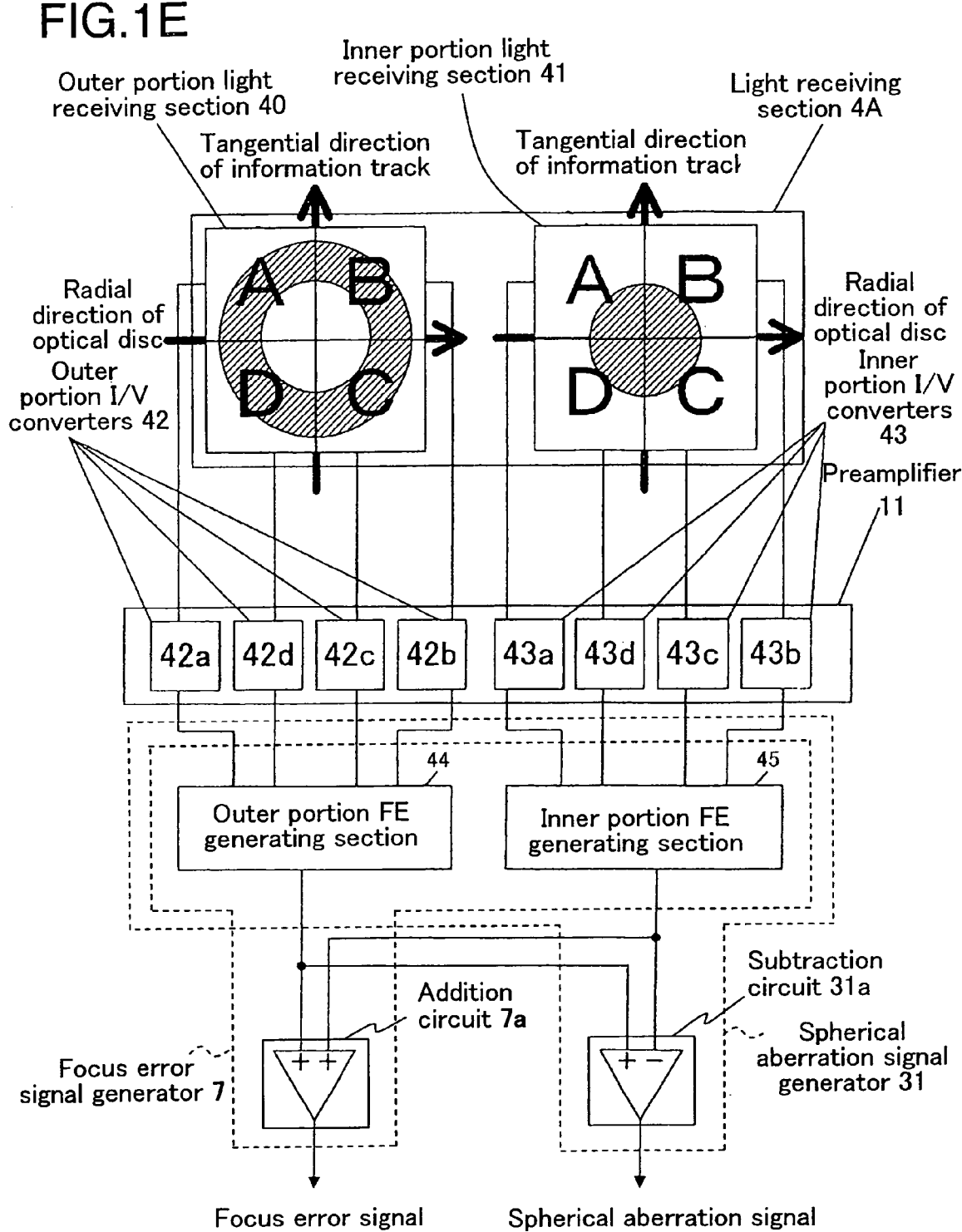
FIG. 1E is a block diagram showing a light receiving section, a preamplifier, a focus error signal generator and a spherical aberration signal generator in the optical disc apparatus of FIG. 1C in greater detail.

FIG. 1E is a block diagram showing the light receiving section 4A, the preamplifier 11, the focus error signal generator 7 and the spherical aberration signal generator 31 in the optical disc apparatus 100A of FIG. 1C in greater detail.

The outer portion light receiving section 40 has four separate regions A, B, C and D.

Also, the inner portion light receiving section 41 has four separate regions A, B, C and D.

In each of the outer portion light receiving section 40 and the inner portion light receiving section 41, regions A and B are separated from regions C and D along a radial direction of the optical disc 20, while the regions A and D are separated from the regions B and C along a tangential direction of an information track.

In FIG. 1E, the tangential direction of an information track refers to a tangential direction of a track on the optical disc 20, while the radial direction of the optical disc 20 refers to a direction perpendicular to a track on the optical disc 20.

The preamplifier 11 comprises four outer portion I/V converters 42 (i.e., an outer portion I/V converter 42a, an outer portion I/V converter 42b, an outer portion I/V converter 42c, and an outer portion I/V converter 42d) and four inner portion I/V converter 43 (i.e., an inner portion I/V converter 43a, an inner portion I/V converter 43b, an inner portion I/V converter 43c, and an inner portion I/V converter 43d).

The focus error signal generator 7 comprises an outer portion FE generating section 44, an inner portion FE generating section 45, and an addition circuit 7a.

The spherical aberration signal generator 31 comprises the outer portion FE generating section 44, the inner portion FE generating section 45, and a subtraction circuit 31a.

In the outer portion light receiving section 40, the regions A, B, C and D of the outer portion light receiving section 40 each generate a photocurrent depending on the amount of light received, and output the generated photocurrent to the outer portion I/V converter 42a, the outer portion I/V converter 42b, the outer portion I/V converter 42c, and the outer portion I/V converter 42d, respectively.

The outer portion I/V converter 42a, the outer portion I/V converter 42b, the outer portion I/V converter 42c, and the outer portion I/V converter 42d each convert the photocurrent to a voltage (signal), which is in turn output to the outer portion FE generating section 44.

The outer portion FE generating section 44 subtracts the sum of the signals output by the outer portion I/V converter 42b and the outer portion I/V converter 42d from the sum of the signals output by the outer portion I/V converter 42a and the outer portion I/V converter 42c to generate an outer portion FE signal (astigmatism method).

The regions A, B, C and D of the inner portion light receiving section 41 each generate a photocurrent depending on the amount of light received, and output the generated photocurrent to the inner portion I/V converter 43a, the inner portion I/V converter 43b, the inner portion I/V converter 43c, and the inner portion I/V converter 43d, respectively.

The inner portion I/V converter 43a, the inner portion I/V converter 43b, the inner portion I/V converter 43c, and the inner portion I/V converter 43d each convert the photocurrent to a voltage (signal), which is in turn output to the inner portion FE generating section 45.

The inner portion FE generating section 45 subtracts the sum of the signals output by the inner portion I/V converter 43b and the inner portion I/V converter 43d from the sum of the signals output by the inner portion I/V converter 43a and the inner portion I/V converter 43c to generate an inner portion FE signal (astigmatism method).

The focus error signal generator 7 generates an FE signal by addition of the outer portion FE signal and the inner portion FE signal. This FE signal is generated in a manner slightly different from the astigmatism method, but its characteristics are equivalent to those obtained by the astigmatism method.

The spherical aberration signal generator 31 generates a spherical aberration signal by subtraction of the outer portion FE signal and the inner portion FE signal.

In this manner, a spherical aberration signal indicating spherical aberration occurring in a light beam spot on the information surface 29 of the optical disc 20 in the optical disc apparatus 100A is generated.

Next, the lens tilt-spherical aberration correction amount association section 36 in the optical disc apparatus 100A of FIG. 1C will be described in more detail.

FIG. 5 is a block diagram showing the lens tilt-spherical aberration correction amount association section 36 of FIG. 1C.

The lens tilt-spherical aberration correction amount association section 36 comprises a lens tilt-spherical aberration correction amount converting section 27 for converting a lens tilt indicated by a tilt control signal to a spherical aberration correction calibration signal.

The lens tilt-spherical aberration correction amount converting section 27 comprises a non-volatile memory 91, in which a correspondence between a tilt of the objective lens 1 and a spherical aberration correction amount is written in advance.

The lens tilt-spherical aberration correction amount converting section 27 converts a lens tilt indicated by a tilt control signal to a spherical aberration correction calibration signal.

The spherical aberration correction calibration signal is added to a spherical aberration correction amount indicated by a spherical aberration correction signal output from the spherical aberration correction control section 35. As a result, the calibrated spherical aberration correction signal is generated.

The calibrated spherical aberration correction signal is output from the lens tilt-spherical aberration correction amount association section 36 to the spherical aberration correction driving circuit 33.

In the lens tilt-spherical aberration correction amount converting section 27 of the optical disc apparatus 100A, the correction amount can also be obtained from a lens tilt using either of the following two techniques: (1) a technique employing a predetermined characteristic function; and (2) a technique employing a predetermined conversion table, as described above.

In the optical disc apparatus 100A, the lens tilt-spherical aberration correction amount converting section 27 obtains an amount of calibration of a spherical aberration correction signal. The calibration amount is added to a spherical aberration correction signal output by the spherical aberration correction control section 35 to generate a calibrated spherical aberration correction amount. This calibrated spherical aberration correction amount is output from the lens tilt-spherical aberration correction control section 90 to the spherical aberration correction driving circuit 33.

Therefore, the details of the lens tilt-spherical aberration correction amount converting section 27 are the same as those described above with reference to FIGS. 2 to 5, except that an amount of calibration of a spherical aberration correction signal is obtained but not a spherical aberration correction amount itself.

In the above description, a spherical aberration correction signal is calibrated based on a lens tilt indicated by a tilt control signal in the lens tilt-spherical aberration correction amount association section 36. The present invention is not limited to this.

Figure 1F:
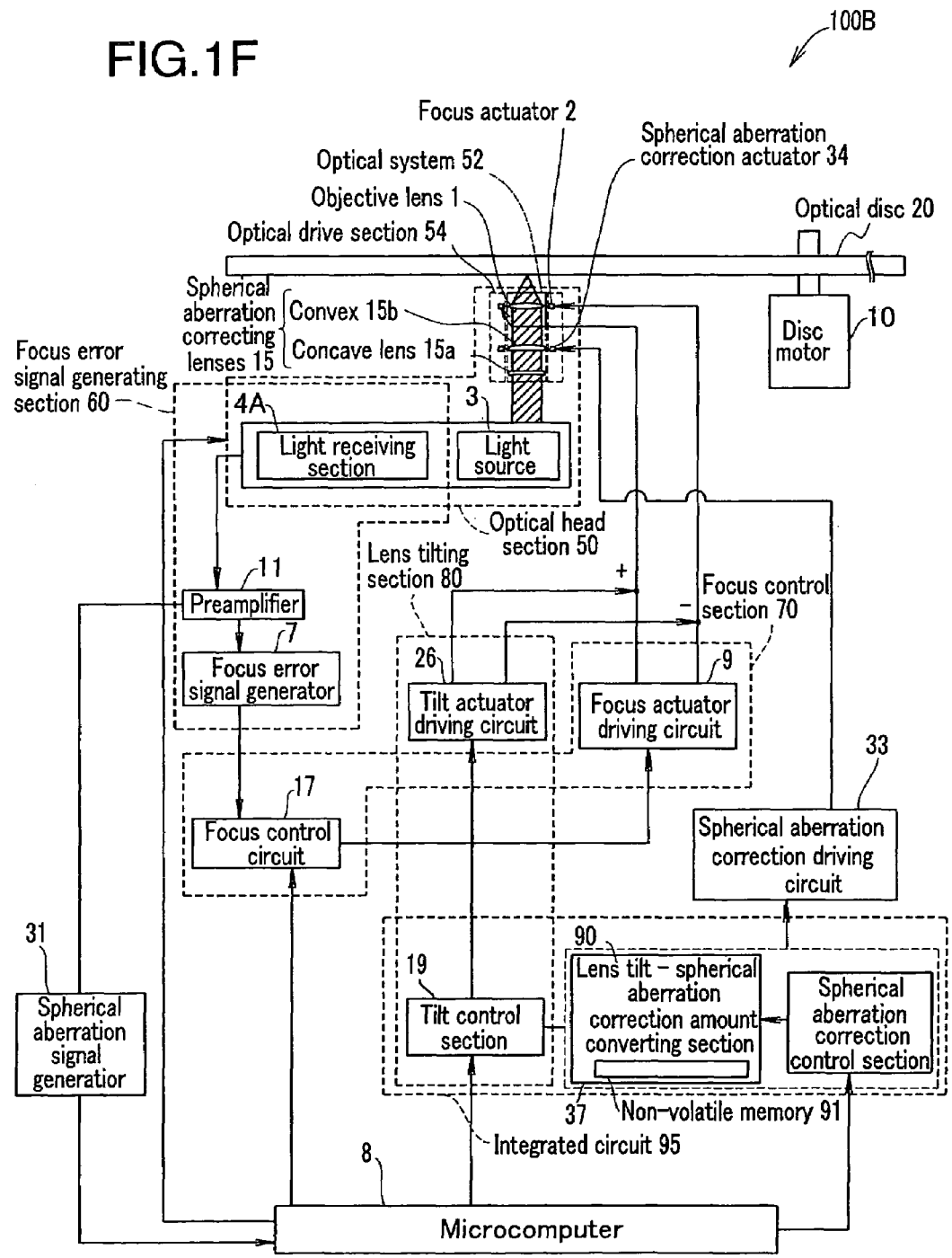
FIG. 1F is a block diagram showing an optical disc apparatus which is another variation of Embodiment 1 of the present invention.

FIG. 1F is a block diagram showing an optical disc apparatus 100B which is another variation of Embodiment 1 of the present invention.

The optical disc apparatus 100B is different from the optical disc apparatus 100A of FIG. 1C in that the lens tilt-spherical aberration correction control section 90 comprises a lens tilt-spherical aberration correction amount converting section 37 instead of the lens tilt-spherical aberration correction amount association section 36.

Parts of the optical disc apparatus 100B having the same functions as those of corresponding parts of the optical disc apparatus 100A are referred to by the same reference characters and the description thereof is omitted for the sake of brevity.

In the optical disc apparatus 100B, the lens tilt-spherical aberration correction control section 90 comprises: a spherical aberration correction control section 35 for generating a spherical aberration correction signal in accordance with a command output from the microcomputer 8 and outputting the generated spherical aberration correction signal to the spherical aberration correction driving circuit 33; and the lens tilt-spherical aberration correction amount converting section 37 for converting the amount of tilt indicated by a tilt control signal to a spherical aberration correction amount and outputting a spherical aberration correction signal indicating the spherical aberration correction amount to the spherical aberration correction driving circuit 33.

The lens tilt-spherical aberration correction amount converting section 37 comprises a non-volatile memory 91, in which a correspondence between a tilt of the objective lens 1 and an amount of spherical aberration correction is written in advance.

In the optical disc apparatus 100B, the spherical aberration correction driving circuit 33 receives a spherical aberration correction signal output from the spherical aberration correction control section 35 as a first spherical aberration correction signal. The spherical aberration correction driving circuit 33 also receives a spherical aberration correction signal output from the lens tilt-spherical aberration correction amount converting section 37 as a second spherical aberration correction signal. The spherical aberration correction driving circuit 33 changes the amount of spherical aberration correction based on the first and second spherical aberration correction signals.

Thus, the spherical aberration correction driving circuit 33 may drive the spherical aberration correcting actuator 34 based on the two spherical aberration correction signals.

According to the above-described optical disc apparatuses 100A and 100B, not only spherical aberration due to the uneven thickness of the protection layer of the optical disc 20 but also spherical aberration due to the tilt of the objective lens 1 can be corrected.

Therefore, coma aberration and spherical aberration occurring in a light beam spot on the information surface of the optical disc 20 can be corrected by the tilt control section 36 and the lens tilt-spherical aberration correction control section 90 independently. As a result, reproduction and recording can be easily and satisfactorily performed.

According to this embodiment, the amount of correction is determined in advance depending on the tilt of the objective lens 1. Spherical aberration may be corrected based on the correction amount.

As described above, a light beam deviates from a direction perpendicular to the optical disc 20 due to warping of the optical disc 20 caused by heat, humidity, manufacturing error or the like, or the imperfect attachment accuracy between the disc motor 10 and the optical disc 20. According to Embodiment 1, such a deviation can be corrected by tilting the objective lens 1 based on a tilt control signal. In addition, spherical aberration occurring due to an influence, such as the uneven thickness of the protection layer of the optical disc 20 or the like, can be corrected based on a spherical aberration correction signal.

Actually, there is a certain amount of error in the detection of a tilt and the correction of spherical aberration. Therefore, when the error is smaller than a predetermined value (e.g., 0.2 deg or less), i.e., a predetermined tolerable amount of tilt of the optical disc 20, the objective lens 1 itself may not be tilted or spherical aberration may not be corrected.

It is assumed that recording or reproduction is continuously performed from the inner periphery to the outer periphery of the optical disc 20. In this case, if the optical disc 20 is in the shape of a bowl, the amount of tilt of the optical disc 20 gradually increases.

In such a situation, the objective lens 1 may be tilted in a stepwise manner every time the amount of tilt of the optical disc 20 is increased by a predetermined value (e.g., every 0.2 deg increase (0.2, 0.4, 0.6 deg, . . . ), etc.). A function or table for obtaining the amount of correction of spherical aberration depending on the tilt of the optical disc 20, which changes in the above-described stepwise manner, may be prepared and written in the non-volatile memory 91 in advance.

In this manner, the tilt control section 19 may change the tilt of the objective lens 1 depending on the tilt of the optical disc 20.

When the tilt of the objective lens 1 is excessively great, spherical aberration may become non-linear or the correction of coma aberration may become impossible. In this case, the quality of a focus error signal and a tracking signal may be significantly deteriorated and therefore a servo may become unstable. In this case, entrainment is repeated in the servo, so that an unstable state is continued for a long time.

Therefore, the tilt control section 19 may set a maximum value of the tilt of the objective lens 1 to limit the range of the tilt of the objective lens 1. In this case, a maximum lens tilt value may be set to be a predetermined value for all optical head sections 50, or alternatively maybe set for each optical head section 50. The non-volatile memory 91 may store the maximum lens tilt value.

As a result, it is possible to prevent the tilt of the objective lens 1 from being excessively great, thereby making it possible to operate an optical disc apparatus more stably.

Embodiment 2

Figure 6A:
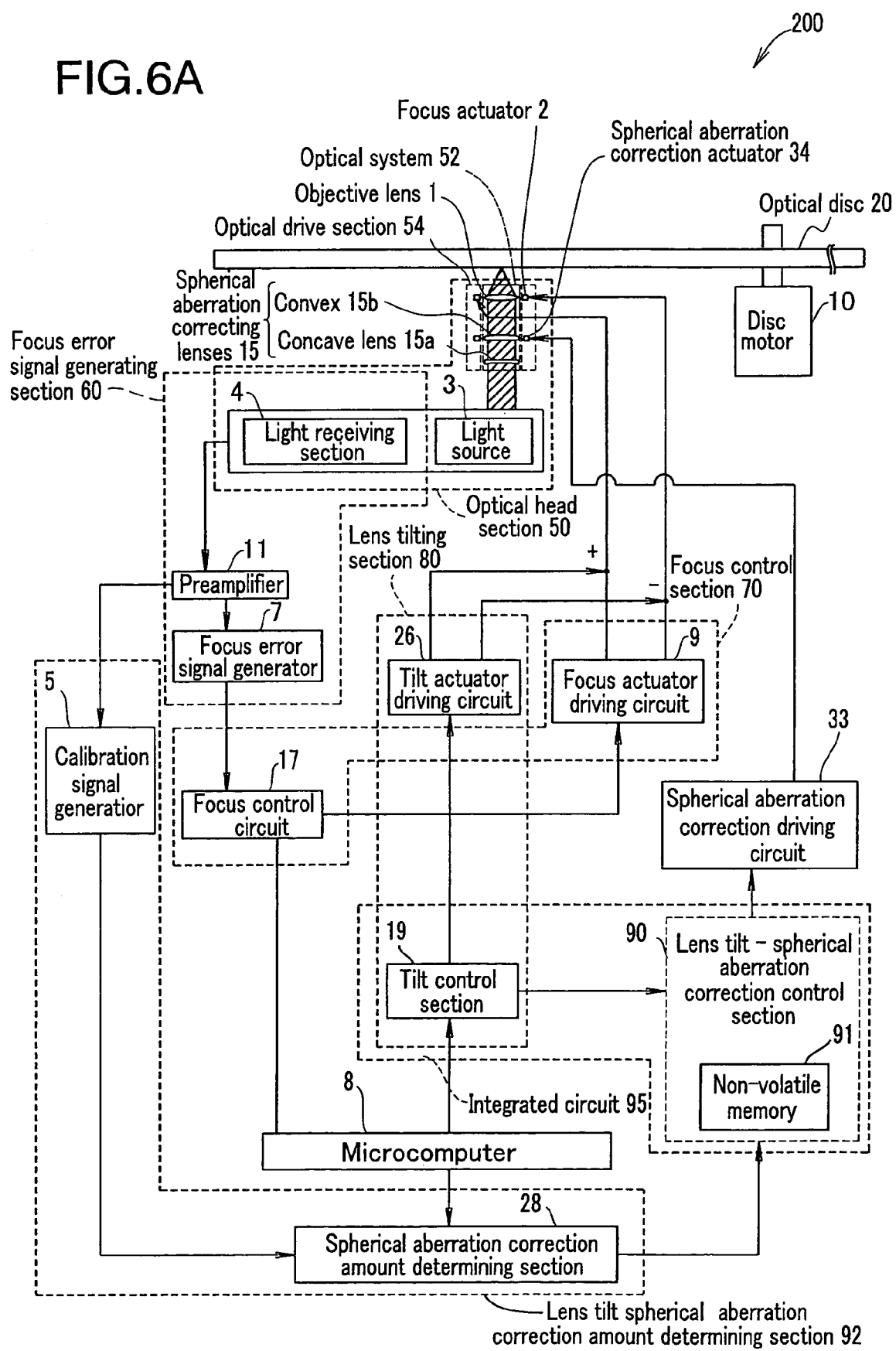
FIG. 6A is a block diagram showing an optical disc apparatus according to Embodiment 2 of the present invention.

FIG. 6A is a block diagram showing an optical disc apparatus 200 according to Embodiment 2 of the present invention.

The optical disc apparatus 200 is different from the optical disc 100 of FIG. 1A in that the optical disc apparatus 200 further comprises a lens tilt-spherical aberration correction amount determining section 92 for determining an amount of correction of spherical aberration depending on the tilt of the objective lens 1 in accordance with a signal output from the preamplifier 11.

Parts of the optical disc apparatus 200 having the same functions as those of corresponding parts of the optical disc apparatus 100 are referred to by the same reference characters and the description thereof is omitted for the sake of brevity.

The lens tilt-spherical aberration correction control section 90 comprises a non-volatile memory 91, in which a correspondence between a tilt of the objective lens 1 and an amount of spherical aberration correction is written in advance.

The lens tilt-spherical aberration correction amount determining section 92 comprises: a calibration signal generator 5 for generating a calibration signal; and a spherical aberration correction amount determining section 28 for determining an amount of spherical aberration correction depending on the tilt of the objective lens 1 based on the calibration signal.

In the optical disc apparatus 200, the microcomputer 8 outputs a command which instructs the tilt control section 19 to perform predetermined lens tilt control.

The tilt control section 19 generates a tilt control signal in accordance with the command output from the microcomputer 8 and outputs the generated tilt control signal to the tilt actuator driving circuit 26. The tilt control section 19 also outputs the tilt control signal to the lens tilt-spherical aberration correction control section 90.

The lens tilt-spherical aberration correction control section 90 generates a spherical aberration correction signal based on the tilt control signal and outputs the generated spherical aberration correction signal to the spherical aberration correction driving circuit 33.

The spherical aberration correction driving circuit 33 generates a drive signal based on the spherical aberration correction signal output from the lens tilt-spherical aberration correction control section 90, and outputs the generated drive signal to the spherical aberration correcting actuator 34.

The spherical aberration correcting actuator 34 changes the distance between the concave lens 15a and the convex lens 15b (spherical aberration correcting lenses 15) based on the drive signal output from the spherical aberration correction driving circuit 33 to generate spherical aberration.

The calibration signal generator 5 generates a calibration signal which directly or indirectly indicates the amount of spherical aberration based on a signal output from the preamplifier 11, and outputs the generated calibration signal to the spherical aberration correction amount determining section 28.

The spherical aberration correction amount determining section 28 determines the amount of correction of spherical aberration depending on the tilt of the objective lens 1, based on the calibration signal in accordance with a command output from the microcomputer 8.

The microcomputer 8 also outputs a signal indicating the amount of tilt, by which the objective lens 1 needs to be tilted, i.e., a signal indicating a lens tilt, to the spherical aberration correction amount determining section 28 as well as the tilt control section 19.

The calibration signal generator 5 may serve as a tracking error signal generating section for generating a tracking error signal indicating an error amount between a light beam spot and a track on the information surface of the optical disc 20 or may serves as the spherical aberration signal generator 31 described in Embodiment 1 with reference to FIGS. 1C, 1E and 1F.

The calibration signal generator 5 may also generate a signal indicating the quality of a signal reproduced from the optical disc 20. Examples of such a signal indicating the quality of a signal reproduced from the optical disc 20 include, but are not limited to, a signal indicating jitter, a signal indicating the amplitude of a reproduced signal, a signal indicating the number of errors or an error rate of information reproduced from the optical disc 20, and the like.

Hereinafter, for example, jitter is used as a calibration signal. Jitter indictes a deviation of an RF signal reproduced from the optical disc 20 from a reference clock for reproduction. Jitter also indicates the quality of a reproduced signal.

Figure 7:
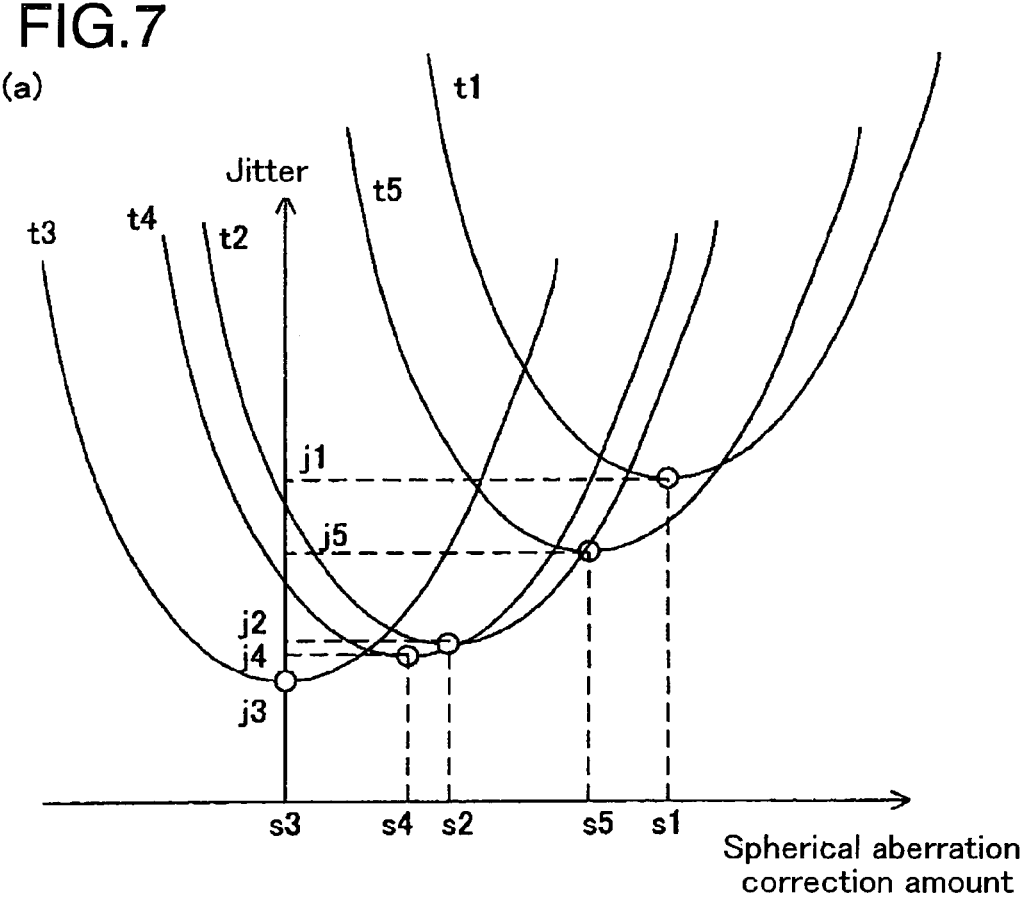
FIG. 7 is a diagram for explaining that a lens tilt-spherical aberration correction amount determining section in the optical disc apparatus of FIG. 6A employs a signal indicating a jitter as a calibration signal to determine an amount of correction of spherical aberration depending on a lens tilt.
Figure 7:
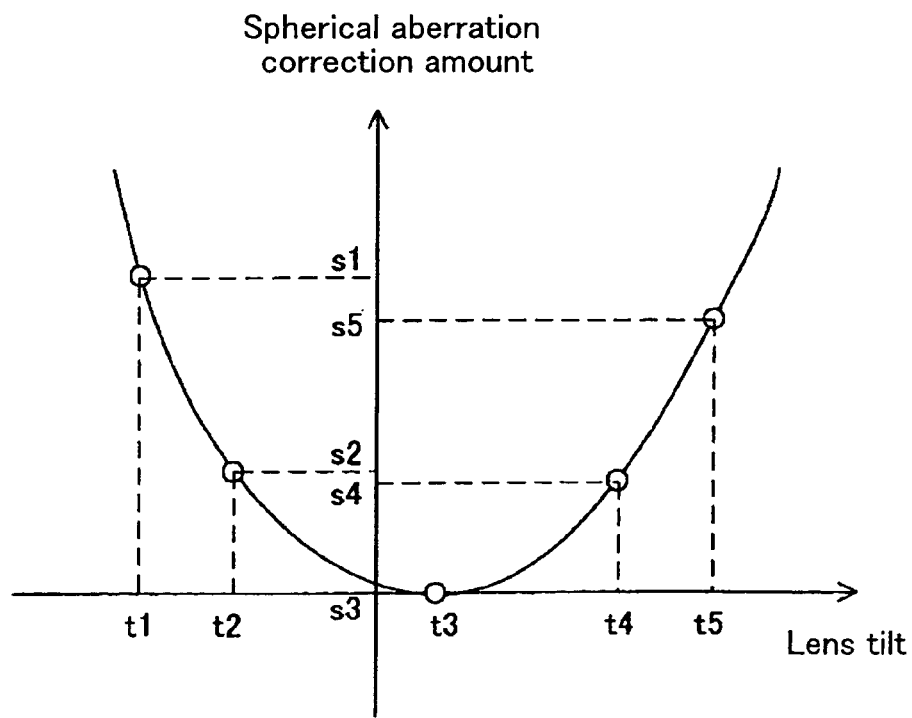

FIG. 7 is a diagram for explaining that the lens tilt-spherical aberration correction amount determining section 92 in the optical disc apparatus 200 (FIG. 6A) employs a signal indicating jitter as a calibration signal to determine the amount of correction of spherical aberration depending on a lens tilt.

Portion (a) of FIG. 7 is a graph showing a relationship between a spherical aberration correction amount and jitter for each of a plurality of lens tilts. In this graph, the horizontal axis represents the spherical aberration correction amount while the vertical axis represents the jitter.

In the graph of portion (a) of FIG. 7, the relationships between a spherical aberration correction amount and jitter for lens tilts t1 to t5 are represented by substantially quadric curves, which are convex downward. This means that for a predetermined lens tilt, the jitter is minimized when the spherical aberration correction amount is a predetermined value.

When a lens tilt is negative, the objective lens 1 is tilted in relation to a light beam as shown in portion (c) of FIG. 3. In this case, when the distance between the concave lens 15a and the convex lens 15b is set to be Lsc, a spherical aberration correction amount is optimized, i.e., performance of reading information from the optical disc 20 is optimized while jitter is minimized.

In the graph of portion (a) of FIG. 7, when lens tilts are t1 and t2 which are negative, spherical aberration correction amounts s1 and s2 are optimum values and jitters j1 and j2 are minimum values, respectively.

When a lens tilt is positive, the objective lens 1 is tilted in relation to a light beam as shown in portion (b) of FIG. 3. In this case, when the distance between the concave lens 15a and the convex lens 15b is Lsb, a spherical aberration correction amount is optimized, i.e., performance of reading information from the optical disc 20 is optimized while jitter is minimized.

In the graph of portion (a) of FIG. 7, when lens tilts are t3, t4 and t5 which are positive, spherical aberration correction amounts s3, s4 and s5 are optimum values while jitters j3, j4 and j5 are minimum values, respectively.

Portion (b) of FIG. 7 is a graph showing a relationship between a lens tilt and a spherical aberration correction amount. In this graph, the horizontal axis represents the lens tilt while the vertical axis represents the spherical aberration correction amount.

The above-described relationship between the lens tilt and the spherical aberration correction amount that minimizes the jitter is represented by a substantially quadric curve as shown in portion (b) of FIG. 7.

In this case, no matter whether the lens tilt is increased or decreased from a predetermined lens tilt (here, a lens tilt t3), spherical aberration changes in the same direction, i.e., the spherical aberration correction amount changes in the same direction.

The spherical aberration correction amount determining section 28 of the optical disc apparatus 200 obtains characteristics represented by the graph as shown in portion (a) of FIG. 7 by changing a spherical aberration correction amount for each of a plurality of lens tilts to find an optimum spherical aberration correction amount (here, the jitter is minimized) and obtains spherical aberration correction amounts for lens tilts as shown in portion (b) of FIG. 7, when the optical disc apparatus 200 is started or shipped. These operations are performed in accordance with a command output from the microcomputer 8 while the tilt control section 19 does not output a tilt control signal to the lens tilt-spherical aberration correction control section 90.

The spherical aberration correction amount determining section 28 sets the relationship between a lens tilt and a spherical aberration correction amount in the lens tilt-spherical aberration correction control section 90.

Specifically, the spherical aberration correction amount determining section 28 writes the relationship between a lens tilt and a spherical aberration correction amount into the non-volatile memory 91 of the lens tilt-spherical aberration correction control section 90 in the form of a function or a table.

Thereafter, the optical disc apparatus 200 can operate the lens tilt-spherical aberration correction control section 90 to automatically achieve optimum spherical aberration correction for a lens tilt as feedforward control. Therefore, even when the lens tilt control is performed, spherical aberration occurring in a light beam spot on the information surface of the optical disc 20 can be maintained to be within a predetermined level.

Thus, the problems caused by spherical aberration occurring due to the tilt of the objective lens 1 can be solved.

In the optical disc apparatus 200 according to Embodiment 2 of the present invention, variations in spherical aberration correction amount occurring due to variations in characteristics of the objective lens 1 caused by variations in manufacture can be calibrated by the spherical aberration correction amount determining section 28. Thereby, reproduction and recording can be satisfactorily performed even when variations in characteristics of the objective lens 1 occur.

Note that a signal indicating the amplitude of an RF signal may be used as a calibration signal. The RF signal is a reproduction signal indicating information reproduced from the optical disc 20. An RF signal whose amplitude is greater has more satisfactory quality.

Figure 8:
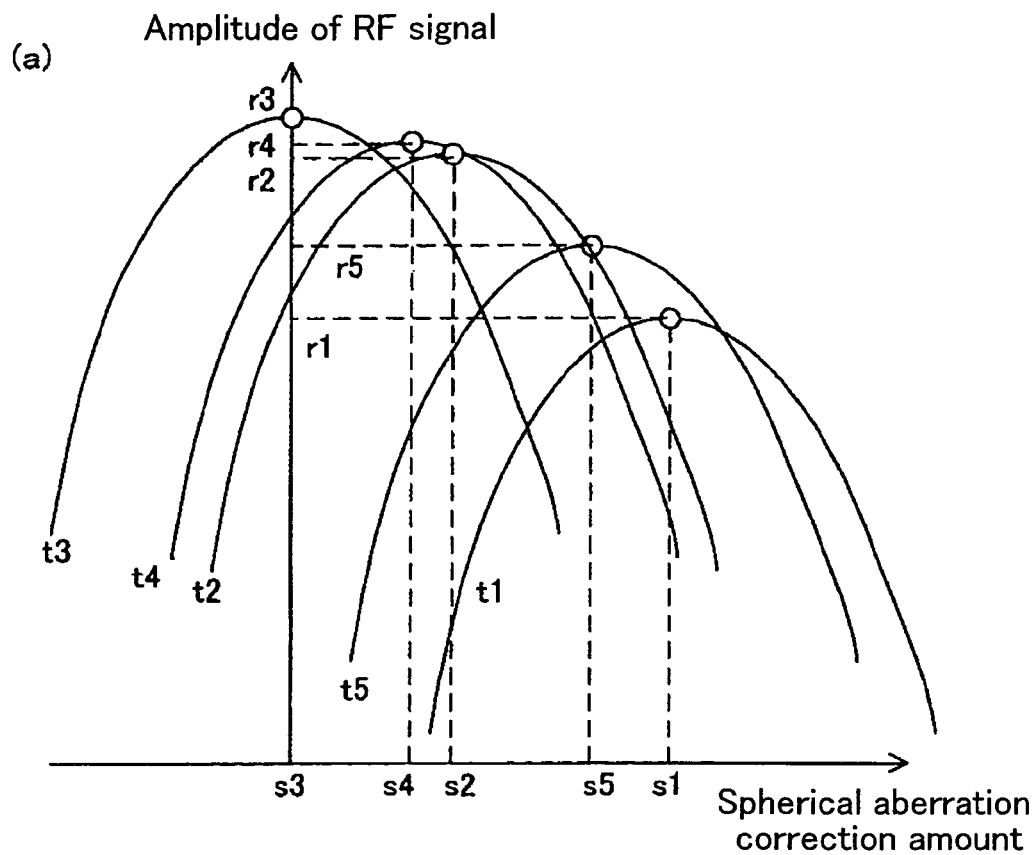
FIG. 8 is a diagram for explaining that a lens tilt-spherical aberration correction amount determining section in the optical disc apparatus of FIG. 6A employs a signal indicating an amplitude of an RF signal as a calibration signal to determine an amount of correction of spherical aberration depending on a lens tilt.
Figure 8:
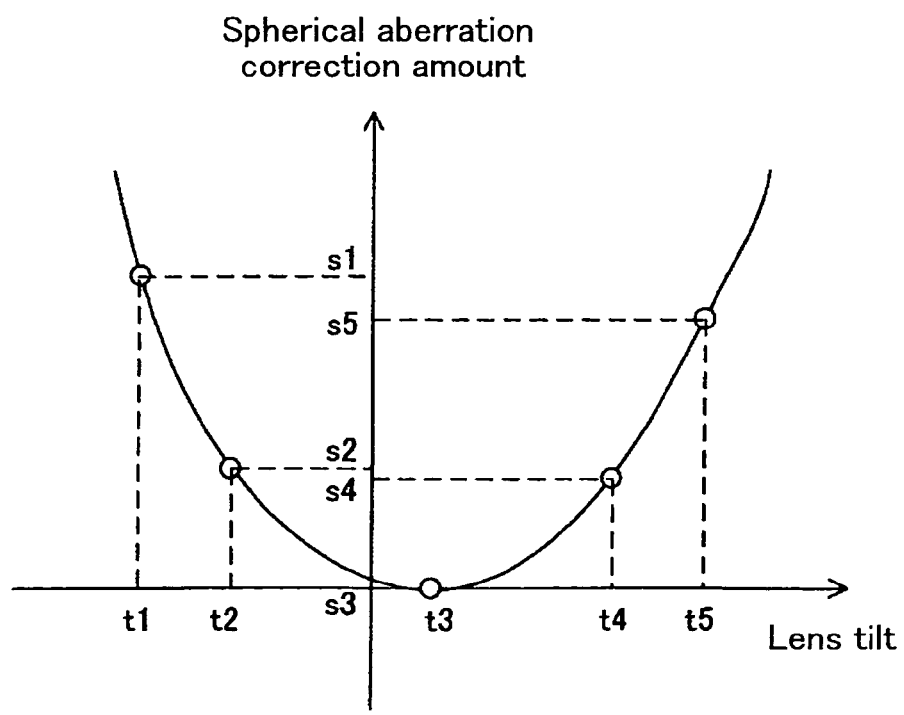

FIG. 8 is a diagram for explaining determination of a spherical aberration correction amount depending on a lens tilt using a signal indicating the amplitude of an RF signal as a calibration signal in the lens tilt-spherical aberration correction amount determining section 92 of the optical disc apparatus 200 of FIG. 6A.

Portion (a) of FIG. 8 is a graph showing a relationship between a spherical aberration correction amount for each of a plurality of lens tilts and the amplitude of an RF signal. In this graph, the horizontal axis represents the spherical aberration correction amount, while the vertical axis represents the amplitude of an RF signal.

Portion (b) of FIG. 8 is a graph showing a relationship between a lens tilt and a spherical aberration correction amount. In this graph, the horizontal axis represents the lens tilt, while the vertical axis represents the spherical aberration correction amount.

In the graph of portion (a) of FIG. 8, the relationships between the spherical aberration correction amount and the amplitude of the RF signal for lens tilts t1 to t5 are represented by substantially quadric curves, which are convex upward. This means that for a predetermined lens tilt, the amplitude of an RF signal is maximized when the spherical aberration correction amount is a predetermined value.

When a lens tilt is negative, the objective lens 1 is tilted in relation to a light beam as shown in portion (c) of FIG. 3. In this case, when the distance between the concave lens 15a and the convex lens 15b is set to be Lsc, a spherical aberration correction amount is optimized, i.e., performance of reading information from the optical disc 20 is optimized while the amplitude of an RF signal is maximized.

In the graph of portion (a) of FIG. 8, when lens tilts are t1 and t2 which are negative, spherical aberration correction amounts s1 and s2 are optimum values while the amplitudes r1 and r2 of RF signals are maximum values, respectively.

When a lens tilt is positive, the objective lens 1 is tilted in relation to a light beam as shown in portion (b) of FIG. 3. In this case, when the distance between the concave lens 15a and the convex lens 15b is Lsb, a spherical aberration correction amount is optimized, i.e., performance of reading information from the optical disc 20 is optimized while the amplitude of an RF signal is maximized.

In the graph of portion (a) of FIG. 8, when lens tilts are t3, t4 and t5 which are positive, spherical aberration correction amounts s3, s4 and s5 are optimum values while the amplitudes r3, r4 and r5 of RF signals are minimum values, respectively.

The above-described relationship between a lens tilt and a spherical aberration correction amount that maximizes the amplitude of an RF signal is represented by a substantially quadric curve as shown in portion (b) of FIG. 8.

In this case, no matter whether the lens tilt is increased or decreased from a predetermined lens tilt (here, a lens tilt t3), spherical aberration changes in the same direction, i.e., the spherical aberration correction amount changes in the same direction.

The other functions or operations of the lens tilt-spherical aberration correction amount determining section 92 are the same as when a signal indicating a jitter is used as a calibration signal, and the description thereof is omitted.

Alternatively, a signal indicating the amplitude of a tracking error signal may be used as a calibration signal. Hereinafter, the tracking error signal may also be referred to as a TE signal. The TE signal indicates an error between a light beam spot and a track on the information surface of the optical disc 20. When the amplitude of the TE signal is greater, the quality of an RF signal is more satisfactory.

Figure 9:
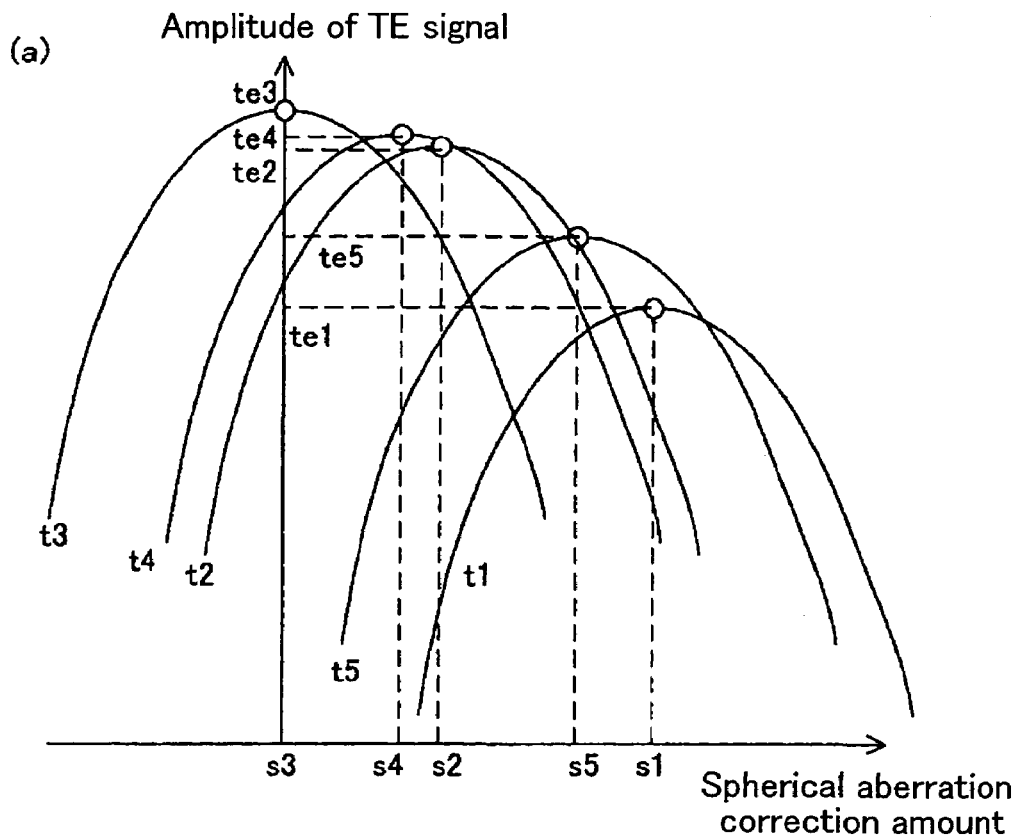
FIG. 9 is a diagram for explaining that a lens tilt-spherical aberration correction amount determining section in the optical disc apparatus of FIG. 6A employs a signal indicating an amplitude of a TE signal as a calibration signal to determine an amount of correction of spherical aberration depending on a lens tilt.
Figure 9:
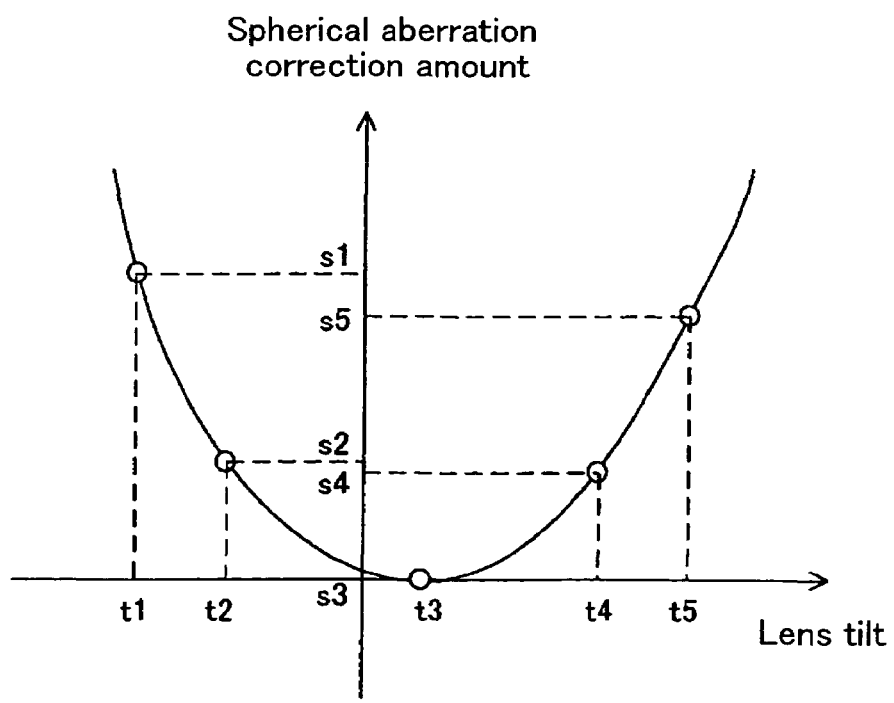

FIG. 9 is a diagram showing determination of a spherical aberration correction amount depending on a lens tilt using a signal indicating the amplitude of a TE signal as a calibration signal in the lens tilt-spherical aberration correction amount determining section 92 of the optical disc apparatus 200 of FIG. 6A.

Portion (a) of FIG. 9 is a graph showing a relationship between a spherical aberration correction amount for each of a plurality of lens tilts and the amplitude of a TE signal. In this graph, the horizontal axis represents the spherical aberration correction amount, while the vertical axis represents the amplitude of the TE signal.

Portion (b) of FIG. 9 is a graph showing a relationship between a lens tilt and a spherical aberration correction amount. In this graph, the horizontal axis represents the lens tilt, while the vertical axis represents the spherical aberration correction amount.

In the graph of portion (a) of FIG. 9, the relationships between the spherical aberration correction amount and the amplitude of the TE signal for lens tilts t1 to t5 are represented by substantially quadric curves, which are convex upward. This means that for a predetermined lens tilt, the amplitude of a TE signal is maximized when the spherical aberration correction amount is a predetermined value.

When a lens tilt is negative, the objective lens 1 is tilted in relation to a light beam as shown in portion (c) of FIG. 3. In this case, when the distance between the concave lens 15a and the convex lens 15b is set to be Lsc, a spherical aberration correction amount is optimized, i.e., performance of reading information from the optical disc 20 is optimized while the amplitude of a TE signal is maximized.

In the graph of portion (a) of FIG. 9, when lens tilts are t1 and t2 which are negative, spherical aberration correction amounts s1 and s2 are optimum values while the amplitudes te1 and te2 of TE signals are maximum values, respectively.

When a lens tilt is positive, the objective lens 1 is tilted in relation to a light beam as shown in portion (b) of FIG. 3. In this case, when the distance between the concave lens 15a and the convex lens 15b is Lsb, a spherical aberration correction amount is optimized, i.e., performance of reading information from the optical disc 20 is optimized while the amplitude of a TE signal is maximized.

In the graph of portion (a) of FIG. 9, when lens tilts are t3, t4 and t5 which are positive, spherical aberration correction amounts s3, s4 and s5 are optimum values while the amplitudes te3, te4 and te5 of TE signals are maximum values, respectively.

The above-described relationship between a lens tilt and a spherical aberration correction amount that maximizes the amplitude of a TE signal is represented by a substantially quadric curve as shown in portion (b) of FIG. 9.

In this case, no matter whether the lens tilt is increased or decreased from a predetermined lens tilt (here, a lens tilt t3), spherical aberration changes in the same direction, i.e., the spherical aberration correction amount changes in the same direction.

The other functions or operations of the lens tilt-spherical aberration correction amount determining section 92 are the same as when a signal indicating jitter is used as a calibration signal, and the description thereof is omitted.

Alternatively, a signal indicating an error rate may be used as a calibration signal. The error rate is the frequency of errors in information occurring when an RF signal reproduced from the optical disc 20 is subjected to error correction (digital processing). When the error rate is smaller, the quality of the RF signal is more satisfactory.

Figure 10:
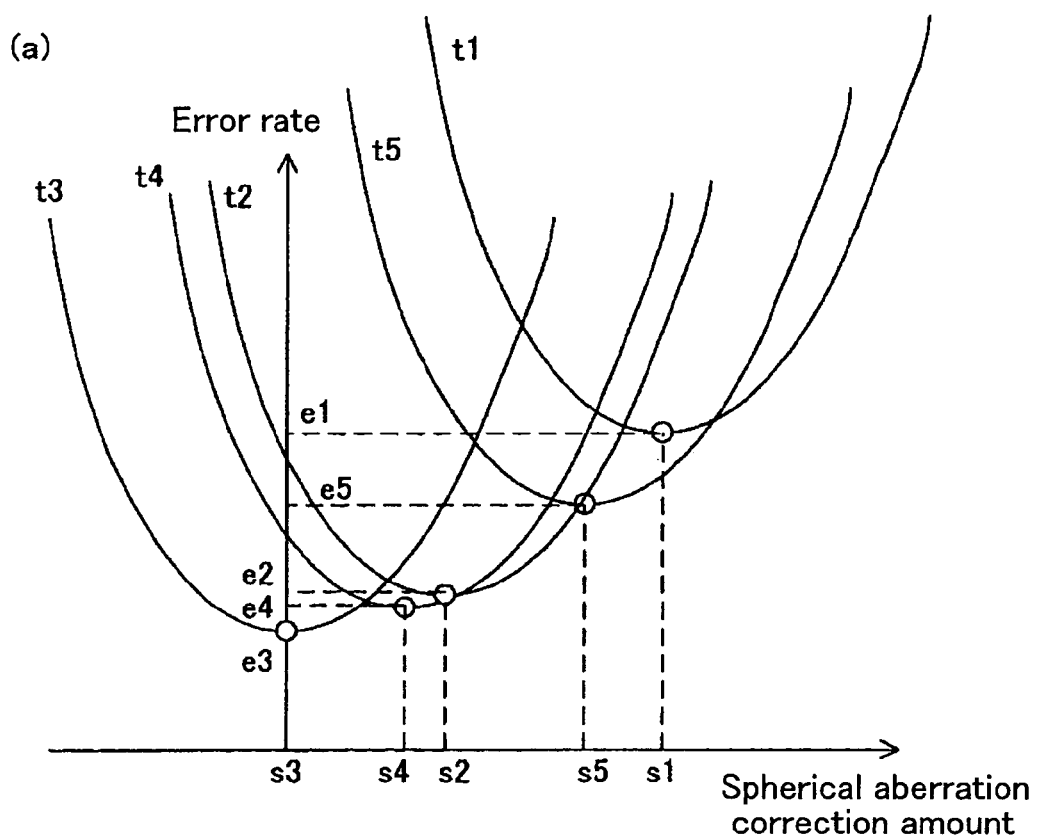
FIG. 10 is a diagram for explaining that a lens tilt-spherical aberration correction amount determining section in the optical disc apparatus of FIG. 6A employs a signal indicating an error rate as a calibration signal to determine an amount of correction of spherical aberration depending on a lens tilt.
Figure 10:
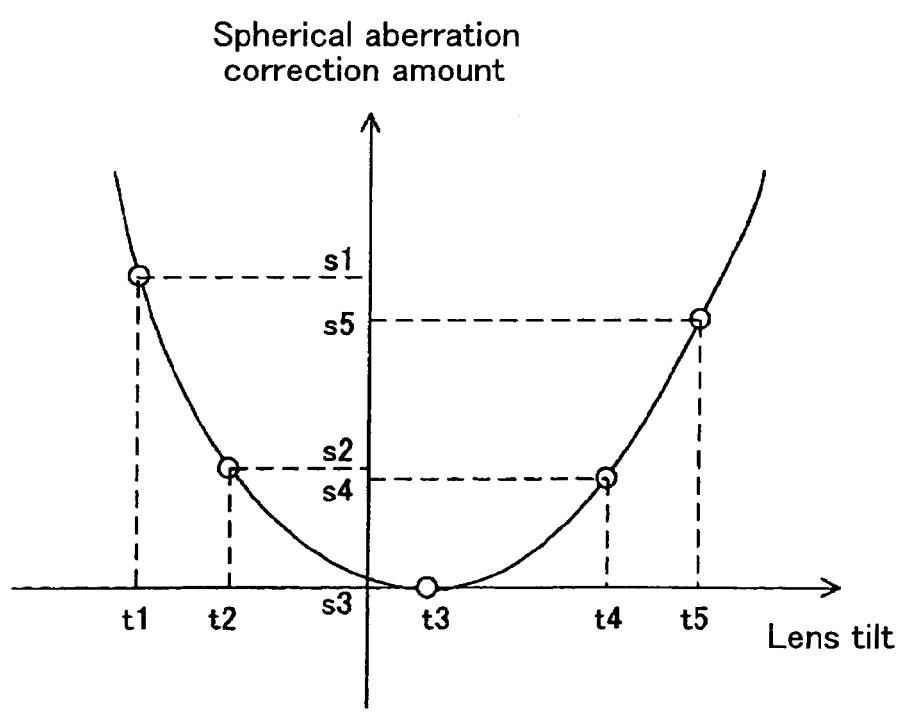

FIG. 10 is a diagram showing determination of a spherical aberration correction amount depending on a lens tilt using a signal indicating the error rate as a calibration signal in the lens tilt-spherical aberration correction amount determining section 92 of the optical disc apparatus 200 of FIG. 6A.

Portion (a) of FIG. 10 is a graph showing a relationship between a spherical aberration correction amount for each of a plurality of lens tilts and the error rate. In this graph, the horizontal axis represents the spherical aberration correction amount, while the vertical axis represents the error rate.

Portion (b) of FIG. 10 is a graph showing a relationship between a lens tilt and a spherical aberration correction amount. In this graph, the horizontal axis represents the lens tilt, while the vertical axis represents the spherical aberration correction amount.

In the graph of portion (a) of FIG. 10, the relationships between the spherical aberration correction amount and the error rate for lens tilts t1 to t5 are represented by substantially quadric curves, which are convex downward. This means that for a predetermined lens tilt, the amplitude of a TE signal is minimum when the spherical aberration correction amount is a predetermined value.

When a lens tilt is negative, the objective lens 1 is tilted in relation to a light beam as shown in portion (c) of FIG. 3. In this case, when the distance between the concave lens 15a and the convex lens 15b is set to be Lsc, a spherical aberration correction amount is optimized, i.e., performance of reading information from the optical disc 20 is optimized while the error rate is minimized.

In the graph of portion (a) of FIG. 10, when lens tilts are t1 and t2 which are negative, spherical aberration correction amounts s1 and s2 are optimum values while error rates e1 and e2 are minimum values, respectively.

When a lens tilt is positive, the objective lens 1 is tilted in relation to a light beam as shown in portion (b) of FIG. 3. In this case, when the distance between the concave lens 15a and the convex lens 15b is Lsb, a spherical aberration correction amount is optimized, i.e., performance of reading information from the optical disc 20 is optimized while the error rate is minimized.

In the graph of portion (a) of FIG. 10, when lens tilts are t3, t4 and t5 which are positive, spherical aberration correction amounts s3, s4 and s5 are optimum values while error rates e3, e4 and e5 are minimum values, respectively.

The above-described relationship between a lens tilt and a spherical aberration correction amount that minimizes the error rate is represented by a substantially quadric curve as shown in portion (b) of FIG. 10.

In this case, no matter whether the lens tilt is increased or decreased from a predetermined lens tilt (here, a lens tilt t3), spherical aberration changes in the same direction, i.e., the spherical aberration correction amount changes in the same direction.

The other functions or operations of the lens tilt-spherical aberration correction amount determining section 92 are the same as when a signal indicating jitter is used as a calibration signal, and the description thereof is omitted.

Note that a signal indicating the number of errors may be used as a calibration signal instead of the signal indicating an error rate.

Alternatively, a spherical aberration signal may be used as a calibration signal. Hereinafter, the spherical aberration signal may also be referred to as an SAE signal. The SAE signal is generated by the spherical aberration signal generator 31 described in Embodiment 1 with reference to FIG. 1E. The SAE signal indicates an amount of spherical aberration occurring in a light beam spot on the information surface of the optical disc 20. When the SAE signal is zero, the quality of an RF signal is satisfactory.

Figure 11:
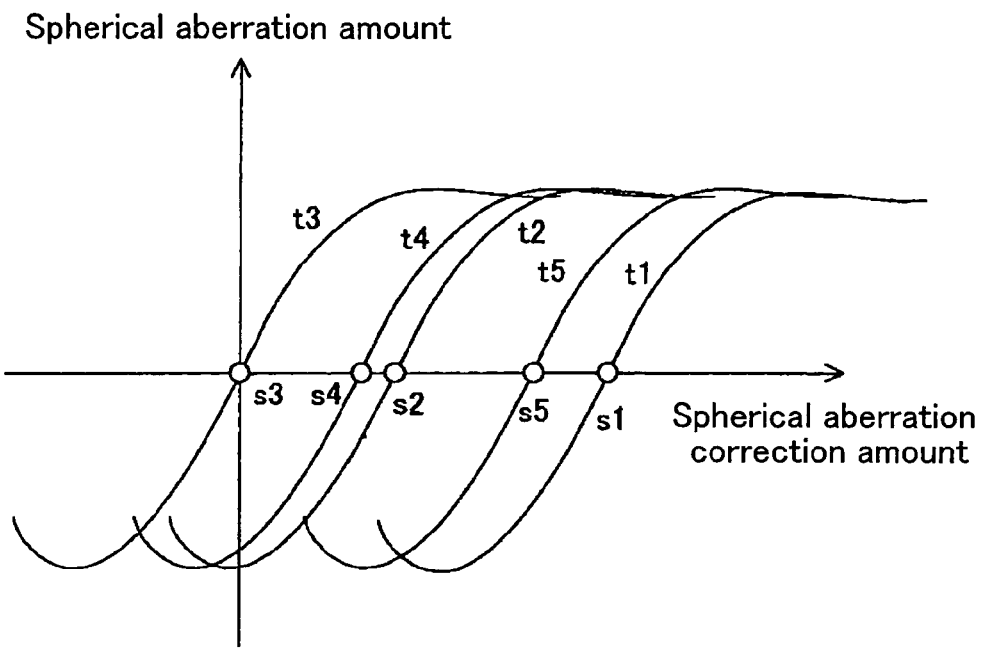
FIG. 11 is a diagram for explaining that a lens tilt-spherical aberration correction amount determining section in the optical disc apparatus of FIG. 6A employs an SAE signal as a calibration signal to determine an amount of correction of spherical aberration depending on a lens tilt.
Figure 11:
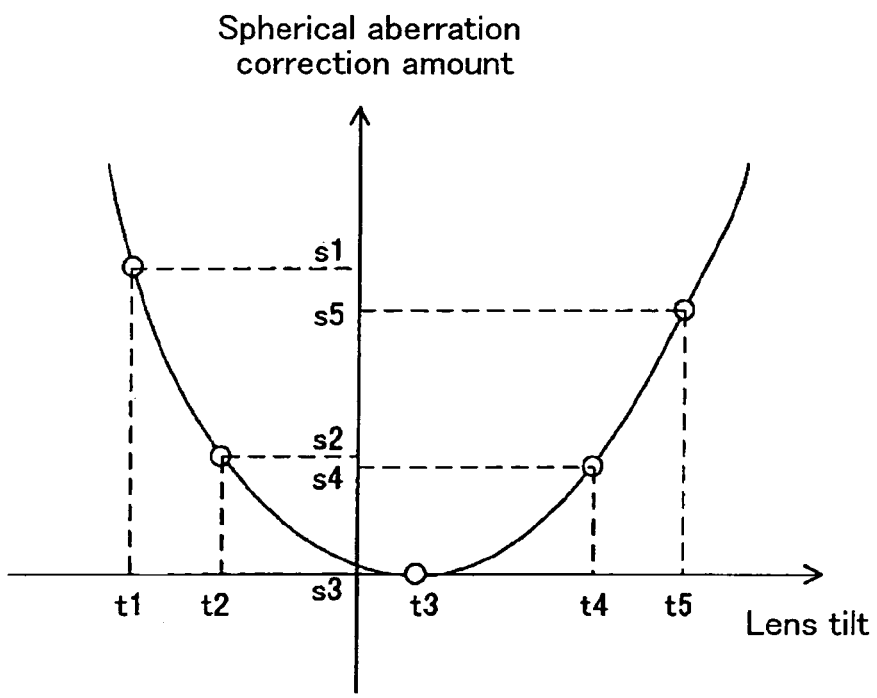

FIG. 11 is a diagram showing determination of a spherical aberration correction amount depending on a lens tilt using the SAE signal as a calibration signal in the lens tilt-spherical aberration correction amount determining section 92 of the optical disc apparatus 200 of FIG. 6A.

Portion (a) of FIG. 11 is a graph showing a relationship between a spherical aberration correction amount for each of a plurality of lens tilts and the SAE signal. In this graph, the horizontal axis represents the spherical aberration correction amount, while the vertical axis represents a spherical aberration amount.

Portion (b) of FIG. 11 is a graph showing a relationship between a lens tilt and a spherical aberration correction amount. In this graph, the horizontal axis represents the lens tilt, while the vertical axis represents the spherical aberration correction amount.

In the graph of portion (a) of FIG. 11, the relationships between the spherical aberration correction amount and the spherical aberration amount for lens tilts t1 to t5 are represented by substantially straight lines in the vicinity of a spherical aberration amount of zero. This means that for a predetermined lens tilt, the spherical aberration amount is zero when the spherical aberration correction amount is a predetermined value.

When a lens tilt is negative, the objective lens 1 is tilted in relation to a light beam as shown in portion (c) of FIG. 3. In this case, when the distance between the concave lens 15a and the convex lens 15b is set to be Lsc, a spherical aberration correction amount is optimized, i.e., performance of reading information from the optical disc 20 is optimized while the spherical aberration amount is zero.

In the graph of portion (a) of FIG. 11, when lens tilts are t1 and t2 which are negative, spherical aberration correction amounts s1 and s2 are optimum values while the spherical aberration amounts are zero, respectively.

When a lens tilt is positive, the objective lens 1 is tilted in relation to a light beam as shown in portion (b) of FIG. 3. In this case, when the distance between the concave lens 15a and the convex lens 15b is Lsb, a spherical aberration correction amount is optimized, i.e., performance of reading information from the optical disc 20 is optimized while the spherical aberration amount is zero.

In the graph of portion (a) of FIG. 11, when lens tilts are t3, t4 and t5 which are positive, spherical aberration correction amounts s3, s4 and s5 are optimum values while the spherical aberration amounts are zero, respectively.

The above-described relationship between a lens tilt and a spherical aberration correction amount that causes the spherical aberration amount to be zero is represented by a substantially quadric curve as shown in portion (b) of FIG. 11.

In this case, no matter whether the lens tilt is increased or decreased from a predetermined lens tilt (here, a lens tilt t3), spherical aberration changes in the same direction, i.e., the spherical aberration correction amount changes in the same direction.

The other functions or operations of the lens tilt-spherical aberration correction amount determining section 92 are the same as when a signal indicating a jitter is used as a calibration signal, and the description thereof is omitted.

Thus, the optical disc apparatus 200 can determine a spherical aberration correction amount corresponding to the tilt of the objective lens 1.

The present invention is not limited to the optical disc apparatus 200 described with reference to FIG. 6A.

Figure 6B:
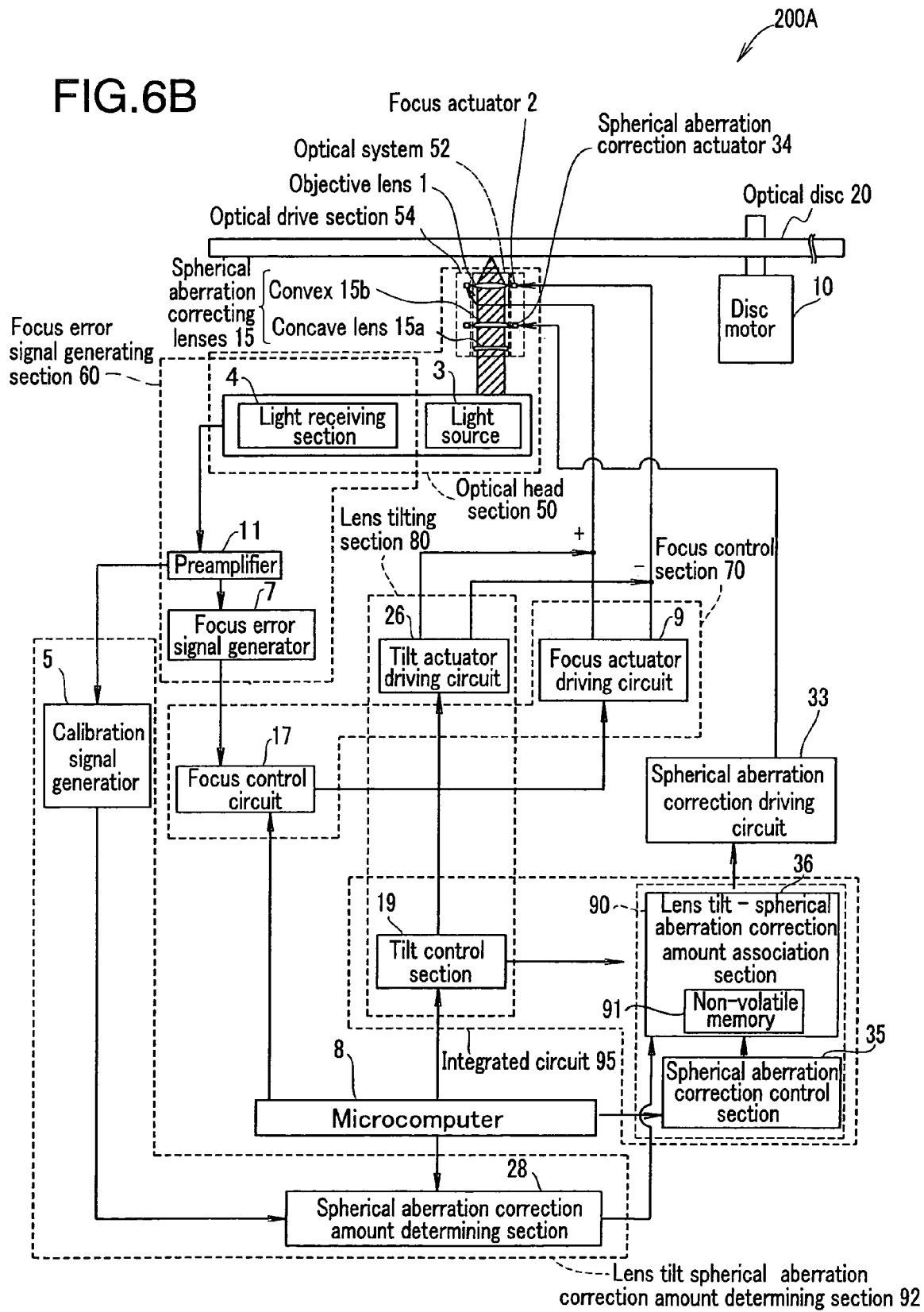
FIG. 6B is a block diagram showing an optical disc apparatus which is a variation of Embodiment 2 of the present invention.

FIG. 6B is a block diagram showing an optical disc apparatus 200A which is a variation of Embodiment 2 of the present invention.

The optical disc apparatus 200A is different from the optical disc apparatus 200 described with reference to FIG. 6A in that the lens tilt-spherical aberration correction control section 90 comprises the spherical aberration correction control section 35 and the lens tilt-spherical aberration correction amount association section 36.

Parts of the optical disc apparatus 200A having the same functions as those of corresponding parts of the optical disc apparatus 200 are referred to by the same reference characters and the description thereof is omitted for the sake of brevity.

In the optical disc apparatus 200A, the spherical aberration correction amount determining section 28 also serves as a spherical aberration correction amount calibrating section.

The lens tilt-spherical aberration correction amount association section 36 comprises a non-volatile memory 91 for writing a correspondence between a tilt of the objective lens 1 and an amount of spherical aberration correction.

In the optical disc apparatus 200A, the microcomputer 8 outputs a command which instructs the tilt control section 19 to perform predetermined lens tilt control.

The tilt control section 19 generates a tilt control signal in accordance with a command output from the microcomputer 8 and outputs the generated tilt control signal to the tilt actuator driving circuit 26 and the lens tilt-spherical aberration correction amount association section 36.

The microcomputer 8 also outputs a command which instructs the spherical aberration correction control section 35 to perform predetermined spherical aberration correction.

The spherical aberration correction control section 35 generates a spherical aberration correction signal in accordance with the command output from the microcomputer 8 and outputs the generated spherical aberration correction signal to the lens tilt-spherical aberration correction amount association section 36.

The lens tilt-spherical aberration correction amount association section 36 calibrates the spherical aberration correction signal output from the spherical aberration correction control section 35 based on the tilt control signal, and outputs the calibrated spherical aberration correction signal to the spherical aberration correction driving circuit 33.

The spherical aberration correction driving circuit 33 generates a drive signal based on the spherical aberration correction signal calibrated by the lens tilt-spherical aberration correction amount association section 36, but not based on the spherical aberration correction signal generated by the spherical aberration correction control section 35, and outputs the generated drive signal to the spherical aberration correcting actuator 34.

The spherical aberration correcting actuator 34 drives the spherical aberration correcting lenses 15 based on the drive signal. The spherical aberration correcting actuator 34 changes the distance between the concave lens 15a and the convex lens 15b (spherical aberration correcting lenses 15) based on the drive signal output from the spherical aberration correction driving circuit 33 to correct spherical aberration.

The calibration signal generator 5 generates a calibration signal which directly or indirectly indicates the amount of spherical aberration based on a signal output from the preamplifier 11, and outputs the generated calibration signal to the spherical aberration correction amount determining section 28.

The spherical aberration correction amount determining section 28 determines an amount of calibration of spherical aberration in the lens tilt-spherical aberration correction amount association section 36, based on the calibration signal in accordance with a command output from the microcomputer 8.

The microcomputer 8 outputs a signal indicating the amount of tilt, by which the objective lens 1 needs to be tilted, i.e., a signal indicating a lens tilt, to the spherical aberration correction amount determining section 28.

Hereinafter, the spherical aberration correction amount determining section 28 and the lens tilt-spherical aberration correction amount association section 36 will be described.

Figure 12:
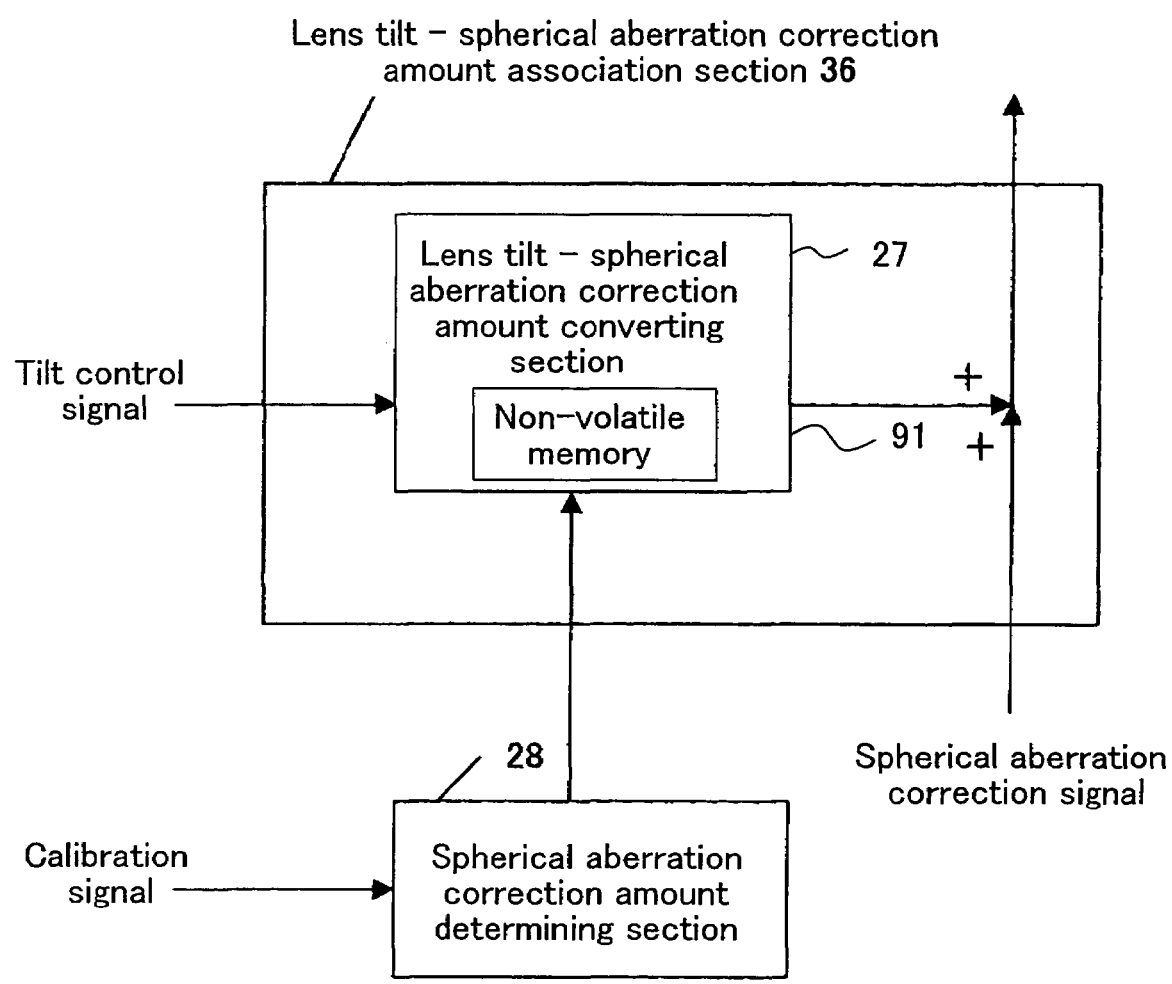
FIG. 12 is a block diagram showing a lens tilt-spherical aberration correction amount association section and a spherical aberration correction amount determining section in the optical disc apparatus of FIG. 6B.

FIG. 12 is a block diagram showing the lens tilt-spherical aberration correction amount association section 36 and the spherical aberration correction amount determining section 28 in the optical disc apparatus 200B of FIG. 6B.

The lens tilt-spherical aberration correction amount association section 36 comprises a lens tilt-spherical aberration correction amount converting section 27.

The lens tilt-spherical aberration correction amount converting section 27 comprises a non-volatile memory 91 for writing a correspondence between a tilt of the objective lens 1 and an amount of calibration of spherical aberration.

The lens tilt-spherical aberration correction amount converting section 27 converts a lens tilt indicated by a tilt control signal to an amount of calibration of a spherical aberration correction signal.

The amount of calibration of a spherical aberration correction signal is added to a spherical aberration correction amount indicated by a spherical aberration correction signal output from the spherical aberration correction control section 35. As a result, the calibrated spherical aberration correction signal is generated.

The calibrated spherical aberration correction signal is output from the lens tilt-spherical aberration correction amount association section 36 to the spherical aberration correction driving circuit 33.

The spherical aberration correction amount determining section 28 determines an amount of calibration of spherical aberration depending on a lens tilt based on a calibration signal. The calibration amount is output to the lens tilt-spherical aberration correction amount converting section 27.

In the optical disc apparatus 200A, the spherical aberration correction amount determining section 28 determines an amount of calibration of spherical aberration.

Therefore, the spherical aberration correction amount determining section 28 of optical disc apparatus 200A is the same as the spherical aberration correction amount determining section 28 of the optical disc apparatus 200, except that an amount of calibration of spherical aberration is determined, but not a spherical aberration correction amount itself.

In the optical disc apparatus 200A, the spherical aberration correction amount determining section 28 operates as follows.

The spherical aberration correction amount determining section 28 of the optical disc apparatus 200A obtains characteristics represented by the graph as shown in portion (a) of FIG. 7 by changing a spherical aberration correction amount for each of a plurality of lens tilts to find an optimum spherical aberration correction amount (here, a jitter is minimized) and obtains calibration amounts for spherical aberration correction amounts for lens tilts as shown in portion (b) of FIG. 7, when the optical disc apparatus 200A is started or shipped. These operations are performed in accordance with a command output from the microcomputer 8 while the lens tilt-spherical aberration correction amount association section 36 does not operate.

The spherical aberration correction amount determining section 28 writes the relationship between a lens tilt and a spherical aberration correction amount into the lens tilt-spherical aberration correction amount association section 36.

Specifically, the spherical aberration correction amount determining section 28 writes the relationship between a lens tilt and a spherical aberration correction amount into the non-volatile memory 91 of the lens tilt-spherical aberration correction amount association section 36 in the form of a function or a table.

Thereafter, the optical disc apparatus 200 can operate the lens tilt-spherical aberration correction amount association section 36 to automatically achieve optimum spherical aberration correction for a lens tilt as feedforward control. Therefore, even when the lens tilt control is performed, spherical aberration occurring in a light beam spot on the information surface of the optical disc 20 can be maintained to be within a predetermined level.

Thus, according to Embodiment 2, coma aberration and spherical aberration occurring in a light beam spot on the information surface of the optical disc 20 can be respectively corrected by the tilt control section 19 and the spherical aberration correction control section 90 independently. As a result, reproduction and recording can be easily and satisfactorily performed.

As described above, a light beam is deviated from a direction perpendicular to the optical disc 20 due to the warp of the optical disc 20 caused by heat, humidity, manufacturing error or the like, or the imperfect attachment accuracy between the disc motor 10 and the optical disc 20. According to Embodiment 1, such a deviation can be corrected by tilting the objective lens 1 depending on a tilt control signal. In addition, spherical aberration occurring due to an influence, such as the uneven thickness of the protection layer of the optical disc 20 or the like, can be corrected.

In the above descriptions, as the distance between the concave lens 15a and the convex lens 15b (spherical aberration correcting lenses 15) is decreased, the focal distance of an inner portion of a light beam is increased while the focal distance of an outer portion of a light beam is decreased. Conversely, as the distance between the concave lens 15a and the convex lens 15b is decreased, the focal distance of an inner portion of a light beam is decreased while the focal distance of an outer portion of a light beam is increased. The present invention is not limited to this.

By changing the configuration of spherical aberration correcting lenses, the relationship between the distance between a concave lens and a convex lens, and the focal distances of inner and outer portions of a light beam may be converse to the above-described relationship. Specifically, when the distance between the concave lens and the convex lens is increased, the focal distance of an inner portion of a light beam may be increased while the focal distance of an outer portion of a light beam may be decreased.

As described above, the spherical aberration correcting lenses 15 are used to correct spherical aberration. The present invention is not limited to this. For example, by changing the refractive index of a liquid crystal element, it is possible to correct spherical aberration which occurs in a light beam spot.

Note that the above-described tilt control section and spherical aberration correction control section may be typically implemented as an integrated circuit(s) (e.g., an LSI, etc.). These elements may be fabricated into respective separate chips, or a portion or all of the elements may be integrated into a single chip.

Examples of an integrated circuit include ICs, system LSIs, super LSIs, and ultra LSIs, which are classified according to the scale of integration.

The integrated circuit of the present invention is not limited to LSIs, and may be implemented using a specialized circuit or a general-purpose processor. A field programmable gate array (FPGA) which can be programmed after LSI fabrication or a reconfigurable processor in which connections or settings of circuit cells within an LSI can be reconfigured, may be employed.

The functional blocks of the present invention may be fabricated into an integrated circuit using a new or derivative technique instead of the LSI technology if such a technique would be developed by a progress in the semiconductor technology.

Accordingly, the present invention provides a high density optical disc apparatus and a spherical aberration correction controlling apparatus which can use particularly a blue-violet laser and a lens having a large numerical aperture to improve the recording/reproduction performance thereof.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. An optical disc apparatus, comprising:
an objective lens for focusing a light beam on an information surface of an optical disc, the optical disc being at least reproduced optically;
an objective lens moving section for moving the objective lens in relation to the information surface;
a focus error signal generating section for generating a focus error signal indicating a focused state of the light beam focused on the information surface;
a focus control section for controlling the objective lens moving section to focus the light beam on the information surface in accordance with the focus error signal;
a lens tilting section for tilting the objective lens to correct coma aberration occurring in a light beam spot focused on the information surface, wherein the lens tilting section generates a tilt control signal based on the tilt of the objective lens;
a spherical aberration signal generator for generating a first spherical aberration correction signal based on light detection occurring in the light beam spot focused on the information surface;
a lens tilt-spherical aberration correction control section which receives the tilt control signal and the first spherical aberration correction signal, and generates a second spherical aberration correction signal by modifying the first spherical aberration correction signal by an amount based on a predetermined relationship between the tilt control signal and a resultant lens tilt spherical aberration; and
a drive section for correcting spherical aberration that receives the second spherical aberration correction signal to drive at least one spherical aberration correction lens.

2. An optical disc apparatus according to claim 1, wherein the lens tilt-spherical aberration correction control section generates the second spherical aberration correction signal by modifying the first spherical aberration correction signal depending on the tilt of the objective lens, using a predetermined function indicating a correspondence between the tilt of objective lens and the spherical aberration correction amount.

3. An optical disc apparatus according to claim 2, wherein the lens tilt-spherical aberration correction control section comprises a non-volatile memory in which the predetermined function is written.

4. An optical disc apparatus according to claim 1, wherein the lens tilt-spherical aberration correction control section generates the second spherical aberration correction signal by modifying the first spherical aberration correction signal depending on the tilt of the objective lens, using a table indicating a correspondence between the tilt of the objective lens and the spherical aberration correction amount.

5. An optical disc apparatus according to claim 4, wherein the lens tilt-spherical aberration correction control section comprises a non-volatile memory in which the table is written.

6. An optical disc apparatus according to claim 1, wherein the lens tilting section tilts the objective lens within a limited range.

7. An optical disc apparatus according to claim 1, wherein the lens tilting section tilts the objective lens depending on the tilt of the optical disc.

8. An optical disc apparatus according to claim 7, wherein the lens tilting section tilts the objective lens depending on a change in the tilt of the optical disc.

9. An optical disc apparatus, comprising:
an objective lens for focusing a light beam on an information surface of an optical disc, the optical disc being at least reproduced optically;
an objective lens moving section for moving the objective lens in relation to the information surface;
a focus control section for controlling the objective lens moving section to focus the light beam on the information surface;
a light receiving section for receiving the light beam reflected from the optical disc;
a lens tilting section for tilting the objective lens to correct coma aberration occurring in a light beam spot focused on the information surface, wherein the lens tilting section generates a tilt control signal based on the tilt of the objective lens;
a lens tilt-spherical aberration correction amount determining section which generates a calibration signal for calibrating spherical aberration based on light detection occurring in the light beam spot focused on the information surface, wherein the lens tilt-spherical aberration correction amount determining section receives the tilt control signal and further generates a spherical aberration correction amount signal in the form of a predetermined relationship between the tilt control signal and a resultant lens tilt spherical aberration;
a lens tilt-spherical aberration correction control section which receives the tilt control signal and the spherical aberration correction amount signal, and generates a spherical aberration correction signal based on the predetermined relationship between the tilt control signal and a resultant lens tilt spherical aberration; and
a drive section for correcting spherical aberration that receives the spherical aberration correction signal to drive at least one spherical aberration correction lens.

10. An optical disc apparatus according to claim 9, wherein the lens tilt-spherical aberration correction amount determining section comprises:
a calibration signal generator for generating the calibration signal for calibrating the spherical aberration; and
a spherical aberration correction amount determining section for determining the spherical aberration correction amount depending on the tilt of the objective lens tilted by the lens tilt section based on the calibration signal.

11. An optical disc apparatus according to claim 10, wherein:
the calibration signal generator comprises a tracking error signal generating section for generating a tracking error signal indicating an error amount between the light beam spot and a track on the information surface; and
the spherical aberration correction amount determining section determines the spherical aberration correction amount based on an amplitude of the tracking error signal.

12. An optical disc apparatus according to claim 10, wherein:
the calibration signal generator generates a signal indicating a quality of a signal reproduced from the optical disc; and
the spherical aberration correction amount determining section determines the spherical aberration correction amount based on the signal indicating the quality of the reproduced signal.

13. An optical disc apparatus according to claim 12, wherein:
the signal indicating the quality of the reproduced signal is a jitter of the reproduced signal; and
the spherical aberration correction amount determining section determines the spherical aberration correction amount based on the jitter.

14. An optical disc apparatus according to claim 12, wherein:
the signal indicating the quality of the reproduced signal is an amplitude of the reproduced signal; and
the spherical aberration correction amount determining section determines the spherical aberration correction amount based on the amplitude of the reproduced signal.

15. An optical disc apparatus according to claim 12, wherein:
the signal indicating the quality of the reproduced signal is the number of errors or an error rate of information reproduced from the optical disc; and
the spherical aberration correction amount determining section determines the spherical aberration correction amount based on the number of errors or the error rate.

16. An optical disc apparatus according to claim 12, wherein:
the calibration signal generator further comprises a spherical aberration signal generator for generating a spherical aberration signal indicating the spherical aberration; and
the spherical aberration correction amount determining section determines the spherical aberration correction amount based on the spherical aberration signal.

17. An optical disc apparatus according to claim 12, wherein the light receiving section comprises:
an inner portion light receiving section for receiving an inner portion of the light beam reflected from the optical disc; and
an outer portion light receiving section for receiving an outer portion of the light beam reflected from the optical disc, and
wherein the spherical aberration correction amount determining section determines the spherical aberration correction amount based on an amount of light received by the inner portion light receiving section and an amount of light received by the outer portion light receiving section.

18. A spherical aberration correction controlling apparatus for controlling a spherical aberration correcting section for correcting spherical aberration occurring in a light beam spot focused on an information surface of an optical disc by an objective lens, the apparatus comprising:
a tilt control section for controlling a tilt of the objective lens to correct coma aberration occurring in the light beam spot focused on the information surface, wherein the tilt control section generates a tilt control signal based on the tilt of the objective lens;
a spherical aberration signal generator for generating a first spherical aberration correction signal based on light detection occurring in the light beam spot focused on the information surface;
a lens tilt-spherical aberration correction control section which receives the tilt control signal and the first spherical aberration correction signal, and generates a second spherical aberration correction signal by modifying the first spherical aberration correction signal by an amount based on a predetermined relationship between the tilt control signal and a resultant lens tilt spherical aberration; and
a drive section for correcting spherical aberration that receives the second spherical aberration correction signal to drive at least one spherical aberration correction lens.

* * * * *

UNITED STATES PATENT AND TRADEMARK OFFICE
CERTIFICATE OF CORRECTION

| | | |
|---|---|---|
| PATENT NO. | : 7,406,007 B2 | Page 1 of 1 |
| APPLICATION NO. | : 10/931373 | |
| DATED | : July 29, 2008 | |
| INVENTOR(S) | : Yuuichi Kuze et al. | |

It is certified that error appears in the above-identified patent and that said Letters Patent is hereby corrected as shown below:

Front Page, Item (74), "Boiselle" should read -- Boisselle --.

Column 31, line 66, "of objective lens" should read -- of the objective lens --.

Signed and Sealed this

Tenth Day of March, 2009

JOHN DOLL
*Acting Director of the United States Patent and Trademark Office*